(12) United States Patent
Kosha

(10) Patent No.: US 9,912,834 B2
(45) Date of Patent: Mar. 6, 2018

(54) DOCUMENT CAMERA DEVICE AND CUTOUT ASSISTANCE METHOD

(71) Applicant: FUJITSU LIMITED, Kawasaki-shi, Kanagawa (JP)

(72) Inventor: Nobuyuki Kosha, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/364,813

(22) Filed: Nov. 30, 2016

(65) Prior Publication Data

US 2017/0171427 A1 Jun. 15, 2017

(30) Foreign Application Priority Data

Dec. 11, 2015 (JP) ................................ 2015-242428

(51) Int. Cl.
*H04N 1/00* (2006.01)
*H04N 1/38* (2006.01)
(Continued)

(52) U.S. Cl.
CPC .......... *H04N 1/38* (2013.01); *G06F 17/3028* (2013.01); *G06F 17/30247* (2013.01);
(Continued)

(58) Field of Classification Search
None
See application file for complete search history.

(56) References Cited

U.S. PATENT DOCUMENTS 7,839,534 B2 * 11/2010 Ueda ................... H04N 1/00132
358/1.13
7,870,137 B2 * 1/2011 Ohwa ............... G06F 17/30265
707/737

(Continued)

FOREIGN PATENT DOCUMENTS

JP 2010-33267 A 2/2010
JP 2011-186670 A 9/2011
JP 2012-119001 A 6/2012

OTHER PUBLICATIONS

"The Next Generation User Interface That Can Be Knowing by Intuition Operated by the Finger Is Developed"(online), Fujitsu Laboratories Ltd., Apr. 3, 2013, (retrieved Nov. 25, 2015), Internet URL: http://pr.fujitsu.com/jp/news/2013/04/3.html (Total 7 pages).

*Primary Examiner* — Scott A Rogers
(74) *Attorney, Agent, or Firm* — Fujitsu Patent Center

(57) ABSTRACT

A document camera device includes a processor that executes a procedure. The procedure includes: performing control so as to display, in cutout processing that cuts out and saves, from an image imaging a subject, an image corresponding to an inside of a region designated for the subject, an image specifying a region associated with identification information of a subject targeted by the current cutout processing on the subject targeted by the current cutout processing, based on history information associated with identification information of the subject and with the region in cutout processing that was executed in the past; and performing processing that, when a region specified by an image specifying the region has been selected, sets an image cut out and saved from inside the selected region as an image that has been cut out by the current cutout processing.

17 Claims, 20 Drawing Sheets

(51) Int. Cl.
*H04N 1/387* (2006.01)
*H04N 1/393* (2006.01)
*H04N 1/195* (2006.01)
*G06K 9/20* (2006.01)
*G06F 17/30* (2006.01)
*H04N 1/10* (2006.01)

(52) U.S. Cl.
CPC ..... *G06F 17/30265* (2013.01); *G06K 9/2081* (2013.01); *H04N 1/00132* (2013.01); *H04N 1/00135* (2013.01); *H04N 1/00148* (2013.01); *H04N 1/00161* (2013.01); *H04N 1/00167* (2013.01); *H04N 1/00172* (2013.01); *H04N 1/00175* (2013.01); *H04N 1/00185* (2013.01); *H04N 1/00196* (2013.01); *H04N 1/00251* (2013.01); *H04N 1/00411* (2013.01); *H04N 1/00442* (2013.01); *H04N 1/00456* (2013.01); *H04N 1/10* (2013.01); *H04N 1/19594* (2013.01); *H04N 1/3871* (2013.01); *H04N 1/3872* (2013.01); *H04N 1/3875* (2013.01); *H04N 1/3935* (2013.01)

(56) References Cited

U.S. PATENT DOCUMENTS

| | | | | |
|---|---|---|---|---|
| 8,749,853 B2* | 6/2014 | Nojiri | ................ | H04N 1/00413 358/1.15 |
| 9,516,177 B2* | 12/2016 | Kano | ................ | H04N 1/00132 |
| 9,787,861 B2* | 10/2017 | Chen | ................ | H04N 1/00196 |
| 2008/0082605 A1* | 4/2008 | Minatogawa | ...... | H04N 1/00132 709/203 |
| 2008/0117455 A1* | 5/2008 | Tomono | ............ | H04N 1/00132 358/1.15 |
| 2008/0120071 A1* | 5/2008 | Minatogawa | ...... | H04N 1/00132 703/1 |
| 2008/0228866 A1* | 9/2008 | Minatogawa | ...... | H04N 1/00132 709/203 |
| 2009/0110314 A1* | 4/2009 | Miyazaki | ............ | H04N 1/3875 382/243 |

* cited by examiner

FIG.5

| PAGE SURFACE ID | ARTICLE ID | ARTICLE POSITION | USER ID | ARTICLE CONTENT |
|---|---|---|---|---|
| {"abc12345"} | (5 cm, 10 cm) | {(x1,y1), (x2,y2), (x3,y3), (x4,y4)} | USER A | {aaa.jpeg, aaa.txt} |
| ... | | | | |

| LAYOUT ID | USER ID | ARTICLE SPECIFYING INFORMATION | POSITION/ SIZE | FORMATTING |
|---|---|---|---|---|
| LAYOUT 1 | USER A | {PAGE SURFACE 1, ARTICLE 1} | {(x1,y1), (x2,y2), (x3,y3), (x4,y4)} | {12pt, black, vertical text, brightness +0%, contrast +10%...} |
| | | {PAGE SURFACE 1, ARTICLE 2} | {(x5,y5), (x6,y6), (x7,y7), (x8,y8)} | {10pt, black, horizontal text, brightness +0%, contrast +10%...} |
| | | ... | | |
| LAYOUT 2 | ... | | | |
| ... | | | | |

DOCUMENT CAMERA DEVICE AND CUTOUT ASSISTANCE METHOD

CROSS-REFERENCE TO RELATED APPLICATION

This application is based upon and claims the benefit of priority of the prior Japanese Patent Application No. 2015-242428, filed on Dec. 11, 2015, the entire. contents of which are incorporated herein by reference.

FIELD

The embodiments discussed herein are related to a document camera device, a cutout assistance method, and a recording medium storing a cutout assistance program.

BACKGROUND

There exists a document camera that is provided with a camera for imaging a work surface and a projector for projecting an image onto the work surface, that captures a fingertip in three-dimensions from the image imaged by the camera, and that recognizes user operations on the work surface. The document camera can scan paper documents such as pamphlets and reports placed on the work surface, and can project the scanned image data using the projector, in accordance with fingertip operations by a user.

Scrapbooking articles by cutting out freely selected articles from a page surface and laying out the cut out articles is one specific way of using this document camera. Articles can be cut out scanning an article in a region designated by a user on a page surface placed on the work surface to acquire image data or text data of the article. Articles can be laid out by a projector projecting articles and a layout frame, and a user performing operations to dispose desired articles within the layout frame.

There is proposed technology that enables easy scrapbooking of articles published on paper media such as newspapers, magazines, and free magazines, and that also automatically redisplays appropriate articles from out of the scrapbooked content to the user according to the time of year. In such technology, when connections are established between client devices, registered article information can be searched for according to given time conditions, based on a date and time at which the connection was established and a registration date and time at which the article information was registered. Then, article information corresponding to the given time conditions is generated as reminder information, and the user is notified with the reminder information.

Technology has also been proposed for performing processing to read, save, and to selectively paste, a large number of plural types of data, such as images and documents using a data processing device. In such technology, a freely selected data range is designated for copying or cutting using a data display screen formed from a document data display and an image data display. In this event, target data designated by a range in a text window, an image window, or a file window, which are displayed on the same data display screen and correspond to attributes of target data, is extracted and moved, arid the display is saved. Then, processing is performed to display windows that separate pasting target data by attribute, make a selective designation from listing data for a desired data attribute displayed in the corresponding window, and paste the desired data.

Moreover, technology has been proposed for enabling layouts of images disposed on page spreads to be modified by a simple operation. In such technology, a screen is displayed for displaying a preview of images on a page spread. On the screen, images of the page spread are displayed in a page spread listing of the preview display screen, and plural icons are displayed for designating a layout pattern for images on the page spread in a layout candidate display region. An operation is performed in which any one icon is selected from out of the plural icons displayed in the layout candidate display region and is moved to an image on the page spread displayed in the page spread listing. This operation modifies the layout of the images on the movement-destination page spread according to the layout pattern corresponding to the moved icon.

Related Patent Documents
 Japanese Laid-Open Patent Publication No. 2010-033267
 Japanese Laid-Open Patent Publication No. 2012-119001
 Japanese Laid-Open Patent Publication No. 2011-186670
Related Non-Patent Documents
 "Fujitsu Develops Next-Generation User interface for Intuitive Touch-Based Operations", (online), Apr. 3, 2013, Fujitsu Laboratories Ltd., (retrieved Nov. 25, 2015), Internet (URL: http://pr.fujistu.com/jp/news/2013/04/3.html)

SUMMARY

According to an aspect of the embodiments, a document camera device includes a memory and a processor coupled to the memory. The processor is configured to perform control so as to display, in cutout processing that cuts out and saves, from an image imaging a subject, an image corresponding to an inside of a region designated for the subject, an image specifying a region associated with identification information of a subject targeted by current cutout processing on the subject targeted by the current cutout processing, based on history information associated with identification information of the subject and with the region in cutout processing that was executed in the past. The processor is also configured to perform processing that, when a region specified by an image specifying the region has been selected, sets an image cut out and saved from inside the selected region as an image that has been cut out by the current cutout processing.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of an article database.

FIG. 6 is a diagram illustrating an example of a layout database.

FIG. 20 is a diagram for explaining an example of reusing layouts of other users.

DESCRIPTION OF EMBODIMENTS

Detailed explanation follows regarding an example of an exemplary embodiment according to technology disclosed herein, with reference to the drawings.

First Exemplary Embodiment

Figure 1:
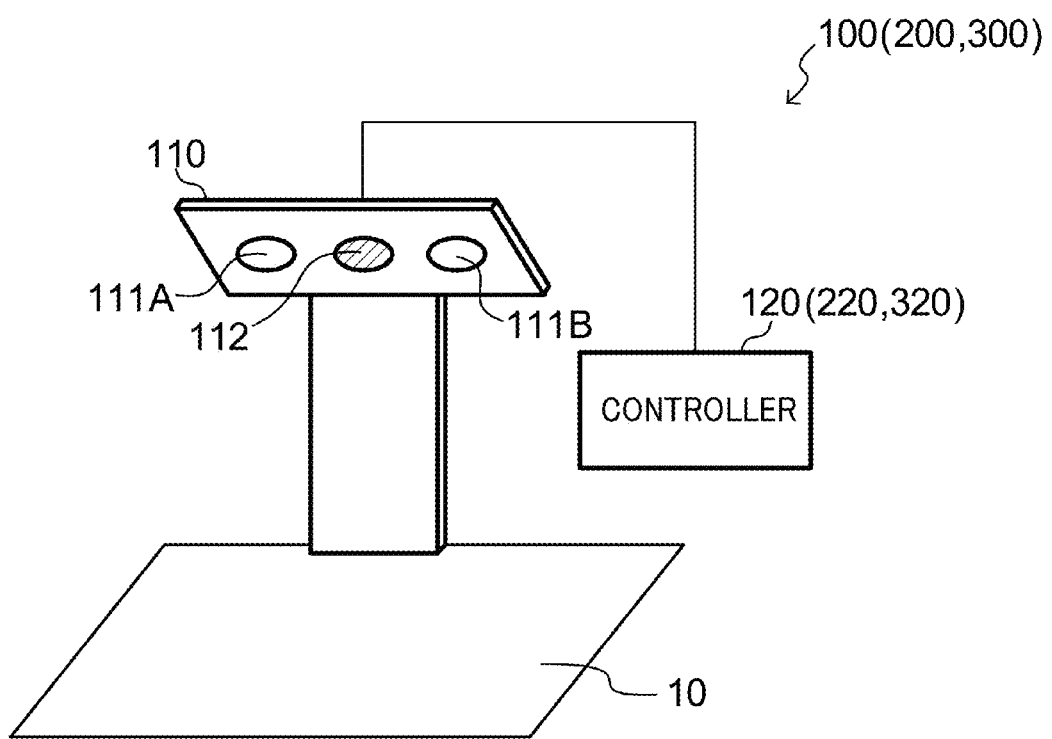
FIG. 1 is a diagram illustrating a schematic configuration of a document camera device according to a first to a third exemplary embodiment.

As illustrated in FIG. 1, a document camera device 100 according to the first exemplary embodiment includes a head section 110 and a controller 120.

The head section 110 includes two imaging units 111A, 111B, and a projector unit 112. The imaging units 111A, 111B may be implemented by, for example, charged coupled device (CCD) cameras, complementary metal oxide semiconductor image sensor (CMOS) cameras, or the like. The projector unit 112 may be implemented by, for example, a cathode ray tube (CRT) projector, a liquid crystal projector, or the like.

Figure 2:
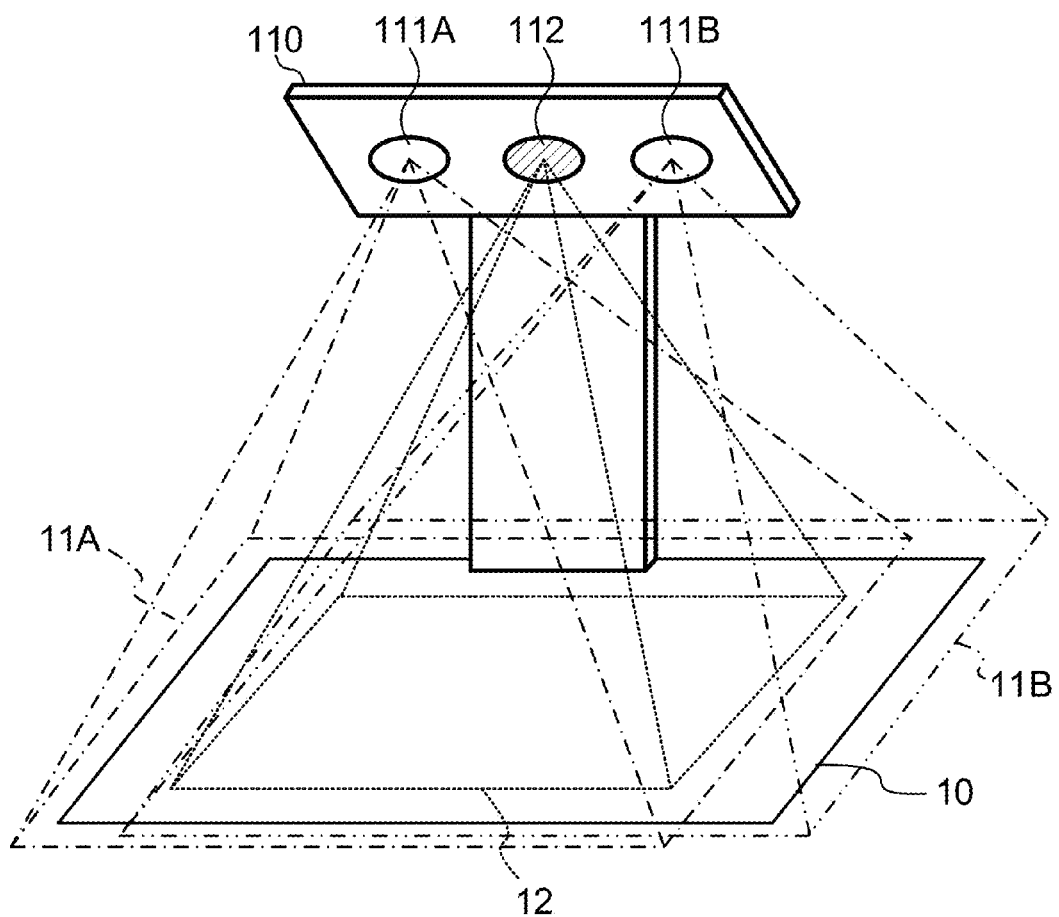
FIG. 2 is a diagram for explaining an imaging ranges of imaging units and a projection range of a projector unit.

As illustrated in FIG. 2, the imaging unit 111A images a given imaging range 11A that includes a work surface 10. The imaging unit 111B images a given imaging range 11B that includes the work surface 10. The projector unit 112 projects an image onto a given projection range 12 on the work surface 10. The imaging range 11A and the imaging range 11B may be different ranges or may be the same range. However, both ranges are ranges that at least include the projection range 12.

The controller 120 may be implemented by an information processing device such as a personal computer.

Figure 3:
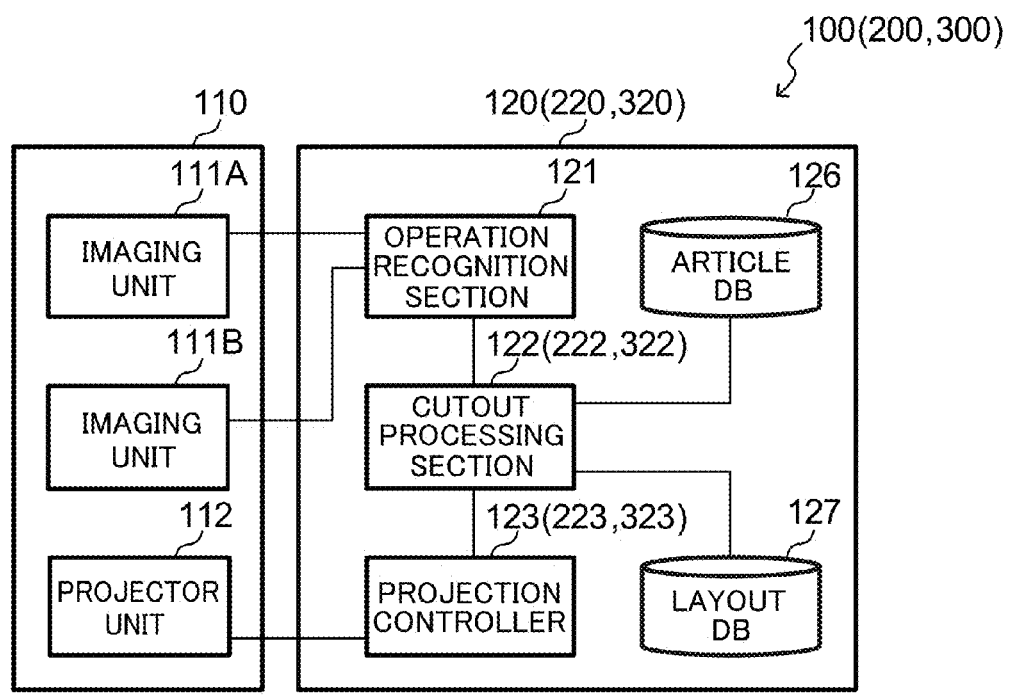
FIG. 3 is a functional block diagram of a document camera device.

FIG. 3 illustrates a functional block diagram of the document camera device 100. As illustrated in FIG. 3, the controller 120 includes an operation recognition section 121, a cutout processing section 122, and a projection controller 123. Moreover, an article database (DB) 126 and a layout DB 127 are stored in a given storage region of the controller 120.

The operation recognition section 121 acquires image data respectively imaged by the imaging unit 111A and the imaging unit 111B, and recognizes user operations performed on the work surface 10. More specifically, the operation recognition section 121 also uses the imaging unit 111A and the imaging unit 111B as a stereo camera to measure the three-dimensional shape of an object on the work surface 10 from image data respectively imaged by the imaging unit 111A and the imaging unit 111B. The operation recognition section 121 also extracts features such as finger color and outline, and recognizes finger shapes from out of objects for which three-dimensional shape was measured. The operation recognition section 121 also adjusts correspondence relationships between a real world coordinate system, an imaging unit coordinate system of the imaging unit 111A and the imaging unit 111B, and a projector unit coordinate system of the projector unit 112, and recognizes user operations indicated by the recognized fingertip shape.

In the present exemplary embodiment, user operations include selection of command buttons projected onto the work surface 10 as projection images, selection and modification of projected images, and designation of a region on the work surface 10 or on a page surface disposed on the work surface 10. Examples of modification of projected images include moving display positions of images, modifying sizes of images, and modifying formatting.

Figure 4:
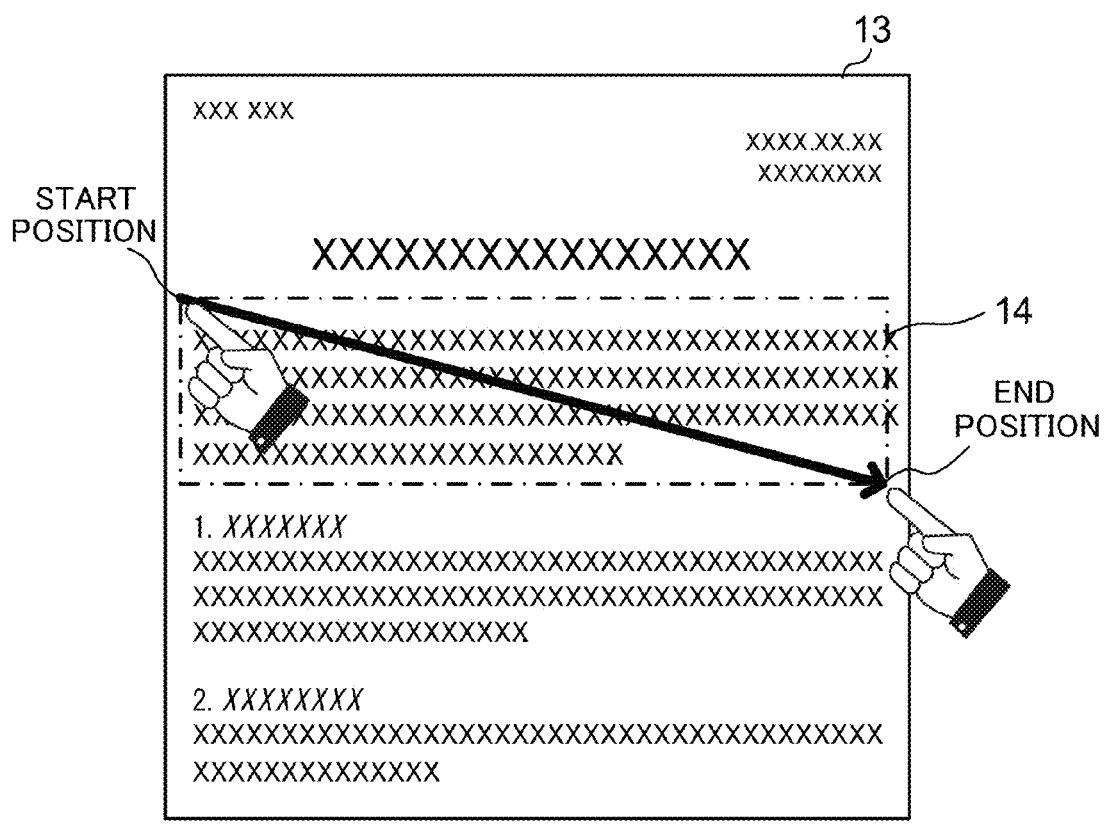
FIG. 4 is a diagram for explaining an example of region designation.

The operation recognition section 121 recognizes the user operations described above using, for example, the position indicated by a given location (for example, the fingertip) of the finger shape, and movement of the finger shape. For example, the operation recognition section 121 recognizes that a command button or an image has been selected in cases in which a position of a projected command button or an image has been touched by the fingertip. Suppose that after a region designation command button has been selected, the operation recognition section 121 has recognized a fingertip action, like that indicated by the arrow in FIG. 4, on a page surface 13 disposed on the work surface 10. In this case, the operation recognition section 121 recognizes, as a designated region 14, a rectangular region that has a straight line connecting a start position (the origin of the arrow) and an end position (the termination point of the arrow) of the action as its diagonal.

Processing that uses image processing to recognize finger shapes and user operations may apply conventionally known methods, and detailed explanation thereof is therefore omitted here.

The operation recognition section 121 passes acquired image data and recognized operation information to the cutout processing section 122. The operation information may include, for example, an operation category such as command button selection, article selection, region designation, or article layout, and in regarding a position coordinates on image data on which the operation was performed.

The cutout processing section 122 executes article cutout processing based on the image data and the operation information passed by the operation recognition section 121. More specifically, when operation information indicating designation of the region 14 has been passed from the operation recognition section 121 to the cutout processing section 122, the cutout processing section 122 performs data processing related to cutting out an article in the designated region 14 and registers information obtained by the data processing in the article DB 126. Detailed description of data processing related to cutting out articles is given later.

FIG. 5 illustrates an example of the article DB 126. In the example of FIG. 5, each row corresponds to article information related to a single cut out article, and each item of article information includes a "page surface ID", an "article ID", an "article position", a "user ID", and "article content" items. The "page surface ID" is information that can uniquely identify the page surface 13 that includes the article indicated by the article information. The "article ID" is information that can uniquely identify the article indicated by the article information on the page surface 13 indicated by the page surface ID. The "article position" is information for specifying the position on the page surface 13 of the article indicated by the article information. The "user ID" is information that can uniquely identify the user who performed the work to cut out the article. "Article content" is image data of the article indicated by the article information, or information such as text data obtained from that image data by optical character recognition (OCR) processing.

In the article DB 126 illustrated in FIG. 5, respective "pave surface ID" and "article ID" items are provided, and configuration is such that plural article IDs may be linked to a single page surface ID. However, configuration may be made such that the page surface ID is included in the article ID.

Here, in the present exemplary embodiment, in cases in which, for example, representatives of respective posts of an enterprise each perform cutout work, a case is envisaged in which the representatives each perform work to cut out the same article such that duplicate cutout work may arise. Thus, in the present exemplary embodiment, the cutout processing section 122 specifies articles that have already been cut out and saved from the page surface 13 of a cutout target, and displays the existence of those articles to the user using the projection controller 123 and the projector unit 112. In cases in which the displayed articles are articles the user himself wants to cut out, the user selects the displayed article rather than designating the region indicating that article. In such a case, the cutout processing section 122 reuses the selected article as the article cut out this time, rather than re-performing cutout related data processing. Note that detailed description of article reuse processing is given later.

Moreover, the cutout processing section 122 executes processing related to the layout employed for the article information that was cut out from the page surface 13 and saved in the article DB 126, and the cutout processing section 122 registers, information regarding the layout in the layout DB 127. Note that detailed description of processing related to layouts is given later.

FIG. 6 illustrates an example of the layout DB 127. In the example of FIG. 6, each row corresponding to a single layout ID corresponds to a single item of layout information, and each item of layout information includes a "layout ID", a "user ID", "article specifying information", "position/size", and "formatting" items. The "layout ID" is information that can uniquely identify the layout information. The "user ID" is information that can uniquely identify the user who generated the layout indicated by the layout information.

The "article specifying information", the "position/size", and the "formatting" are employed-article information related to the article that was employed in the layout indicated by the layout information. A single item of layout information may include plural items of employed-article information. The "article specifying information" is information for specifying the article indicated by the employed-article information. The "position/size" is information indicating at what position and at what size the article indicated by the employed-article information is disposed in the layout. The "formatting" is information indicating formatting set for the article indicated by the employed-article information.

Note that description regarding the method of acquiring the information registered as each item in the article DB 126 and the layout DB 127 is given later.

The projection controller 123 controls the projector unit 112 so as to project a projection image based on the recognition result of the operation recognition section 121 and the processing result of the cutout processing section 122, onto the work surface 10 or onto the page surface 13 disposed on the work surface 10. Detailed description of the projected projection images is given later.

Figure 7:
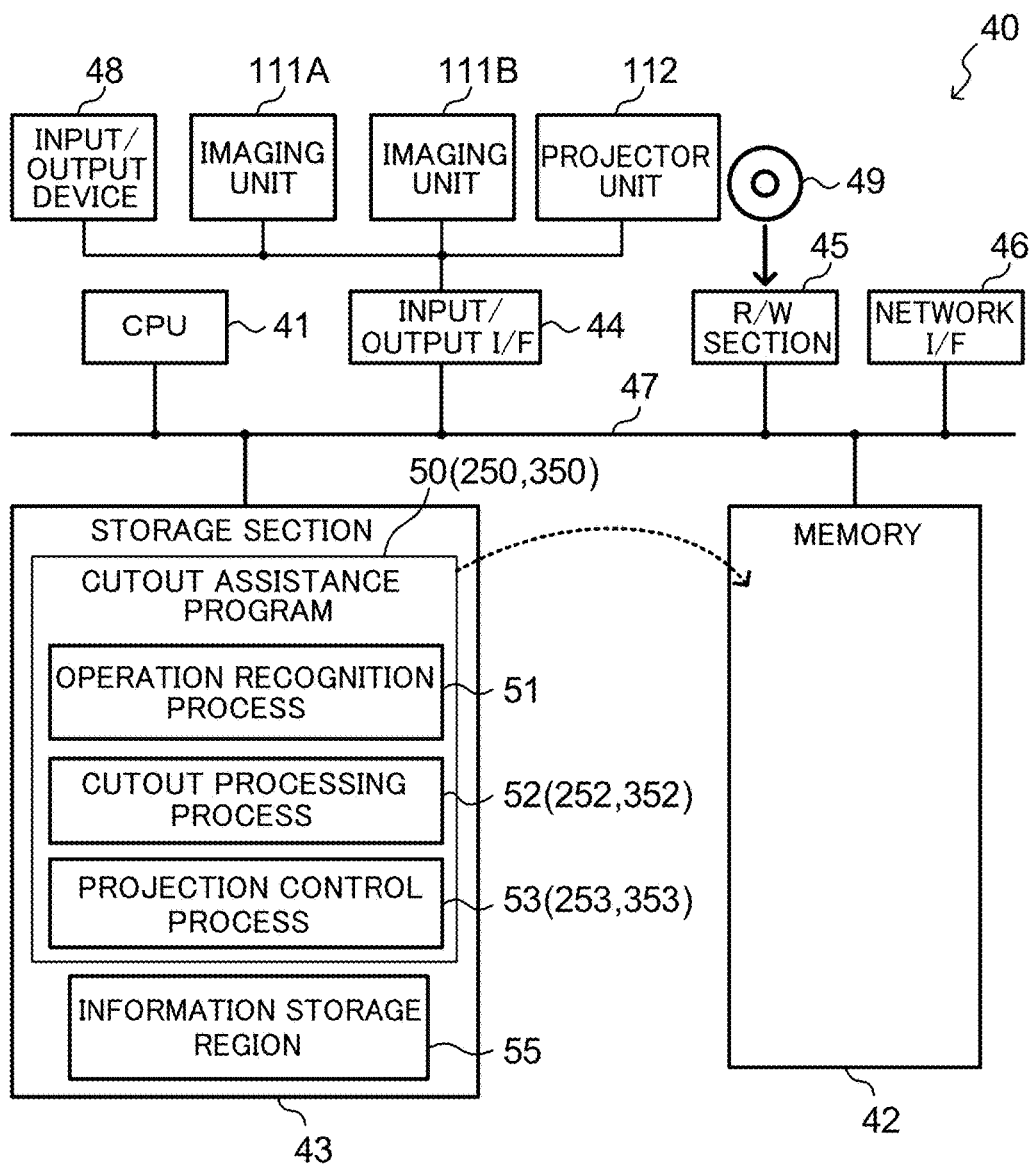
FIG. 7 is a block diagram illustrating a schematic configuration of a computer that functions as the document camera device.

The document camera device 100 may, for example, be implemented in the computer 40 illustrated in FIG. 7. The computer 40 includes a CPU 41, memory 42 serving as a temporary storage region, and a non-volatile storage section 43. The computer 40 also includes a keyboard, a card reader input/output devices such as a display, and an input/output interface (I/F) 44 to which the imaging units 111A, 111B and the projector unit 112 are connected. The computer 40 also includes a read/write (R/W) section 45 that controls reading and writing of data to and from a recording medium 49, and a network I/F 46 that connects to a network such as the Internet. The CPU 41, the memory 42, the storage section 43, the input/output I/F 44, the R/W section 45, and the network I/F 46 are connected to one another via a bus 47.

The storage section 43 may be implemented by, for example, a hard disk drive (HDD), a solid state drive (SSD), or flash memory. The storage section 43 serving as a storage medium stores a cutout assistance program 50 for causing the computer 40 to function as the document camera device 100. The cutout assistance program 50 includes an operation recognition process 51, a cutout processing process 52, and a projection control process 53. The storage section 43 also includes an information storage region 55 that stores the information respectively making up the article DB 126 and the layout DB 127.

The CPU 41 reads the cutout assistance program 50 from the storage section 43, expands the cutout assistance program 50 into the memory 42, and sequentially executes the processes included in the cutout assistance program 50. The CPU 41 operates as the operation recognition section 121 illustrated in FIG. 3 by executing the operation recognition process 51. The CPU 41 also operates as the cutout processing section 122 illustrated in FIG. 3 by executing the cutout processing process 52. The CPU 41 also operates as the projection controller 123 illustrated in FIG. 3 by executing the projection control process 53. The CPU 41 also reads each item of information from the information storage region 55 to respectively expand the article DB 126 and the layout DB 127 into the memory 42. The computer 40, which executes the cutout assistance program 50, thereby functions as the document camera device 100.

Note that functionality implemented by the cutout assistance program 50 may be implemented by, for example, a semiconductor integrated circuit, or more specifically, by an application specific integrated circuit (ASIC).

Next, explanation follows regarding operation of the document camera device 100 according to the first exemplary embodiment. A cutout mode for executing cutting out of articles, and a layout mode for executing laying out of articles that have been cut out, are prepared in the document camera device 100. When the document camera device 100 is started up and the cutout mode is selected by the user, the document camera device 100 executes the cutout processing illustrated in FIG. 8. Moreover, when the layout mode is selected the user, the document camera device 100 executes the layout processing illustrated in FIG. 13. Detailed description of each type of processing is given below.

First explanation follows regarding cutout processing.

Figure 8:
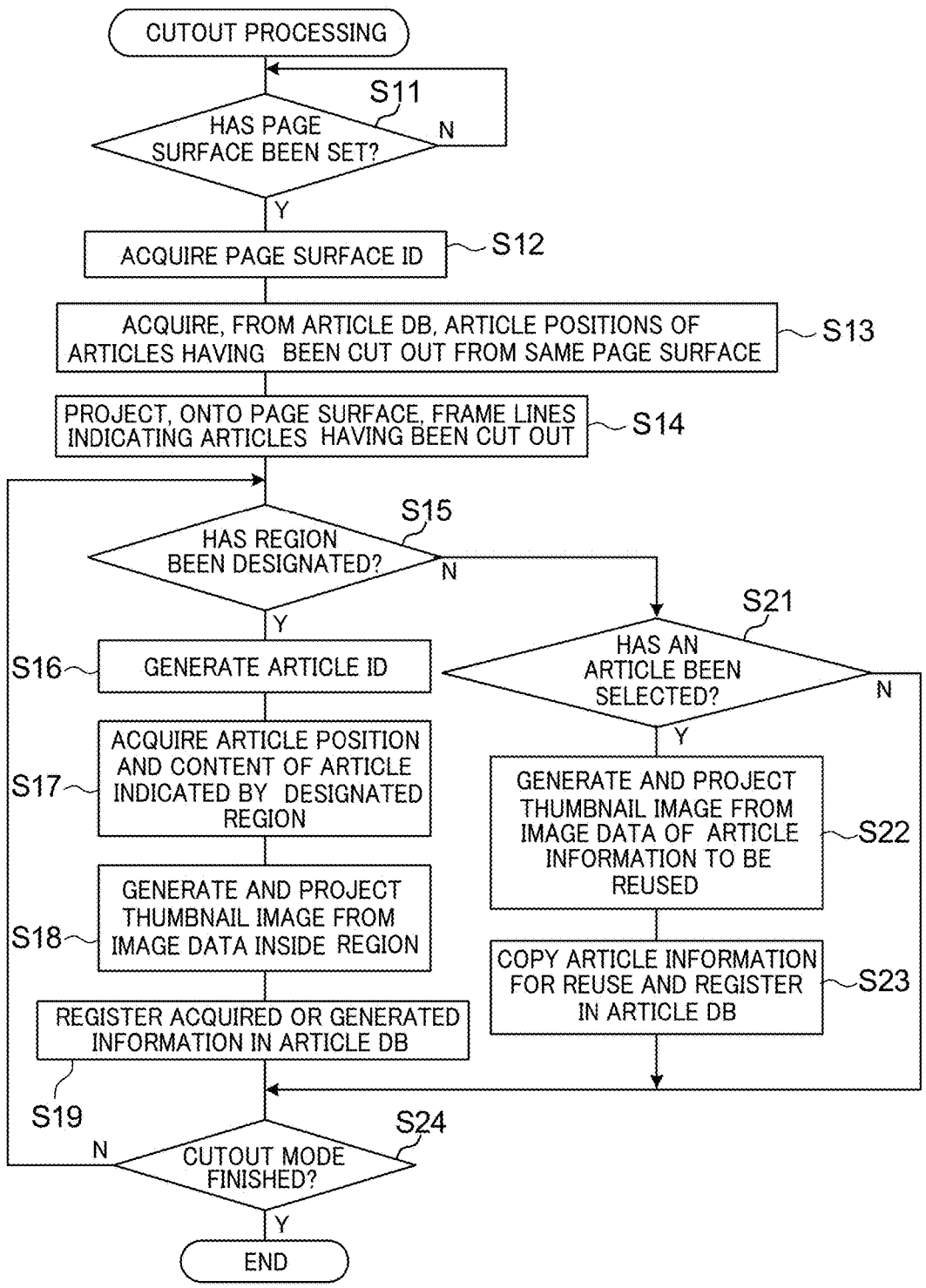
FIG. 8 is a flowchart illustrating an example of cutout processing of the first exemplary embodiment.

At step S11 of the cutout processing illustrated in FIG. 8, the operation recognition section 121 acquires image data respectively imaged by the imaging unit 111A, 111B, and determines whether or not the page surface 13 has been set on the work surface 10. For example, the operation recognition section 121 can determine whether or not the page surface 13 has been set based on differences between image data imaging the work surface 10 in a state in which the page surface 13 has not been set and subsequently input image data. Moreover, determination made as to whether or not the page surface 13 has been set may be made according to whether or not a command indicating that the page surface 13 has been set has been input by user operation. Processing transitions to step S12 in cases in which the page surface 13 has been set, or the determination of the current step is repeated in cases in which the page surface 13 has not been set.

Figure 9:
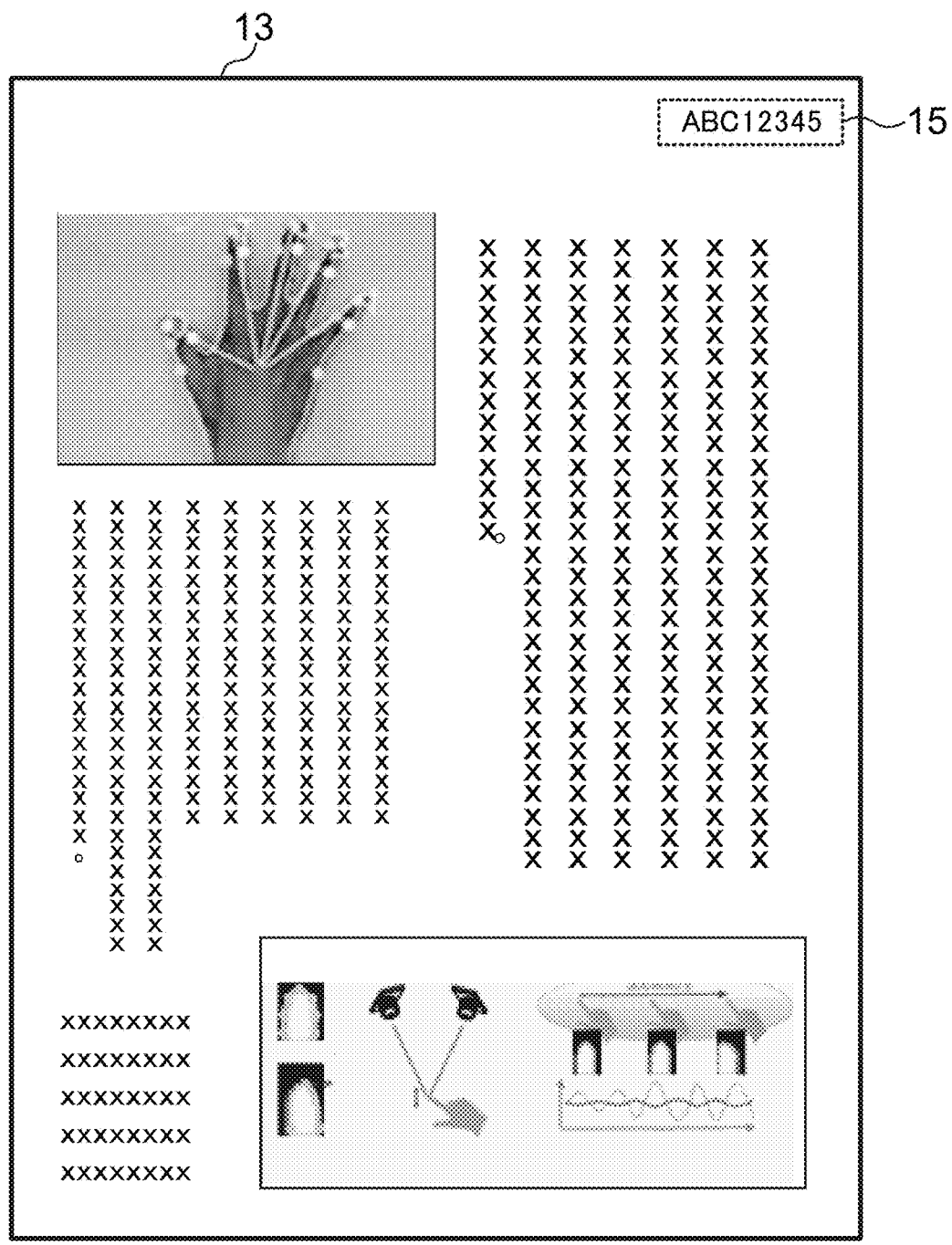
FIG. 9 is a diagram illustrating an example of a page surface disposed on a work surface.

At step S12, the operation recognition section 121 passes the image data imaged by the page surface 13 to the cutout processing section 122. The cutout processing section 122 acquires the page surface ID from the passed image data. For example, as illustrated in FIG. 9, the cutout processing section 122 specifies a predetermined region of the image data imaging the page surface 13 as a page surface information region 15 described by information that can identify the page surface 13. The cutout processing section 122 acquires, as the page surface ID of the page surface 13, text data ("ABC12345" in the example of FIG. 9) obtained from the image data inside the specified page surface information region 15 by OCR processing. For example, a region described by information such as "published MM/DD/YY, Newspaper X, edition Y, page Z" may be specified as the page surface information region 15 in cases in which the page surface 13 is a newspaper. Moreover, the cutout processing section 122 may acquire information inputted by the user, image data of the page surface 13, hash information of the image data or OCR data, a combination of this information, or the like as the page surface ID.

Next, at step S13, the cutout processing section 122 references the article DB 126 and specifies article information in the article DB 126 having a "page surface ID" that is the same as the page surface ID acquired at step S12 above. Articles indicated by the specified article information refer to articles that have already been cut out and saved from the page surface 13 disposed on the work surface 10. The cutout processing section 122 passes the "article position" information of the specified article information to the projection controller 123.

Figure 10:
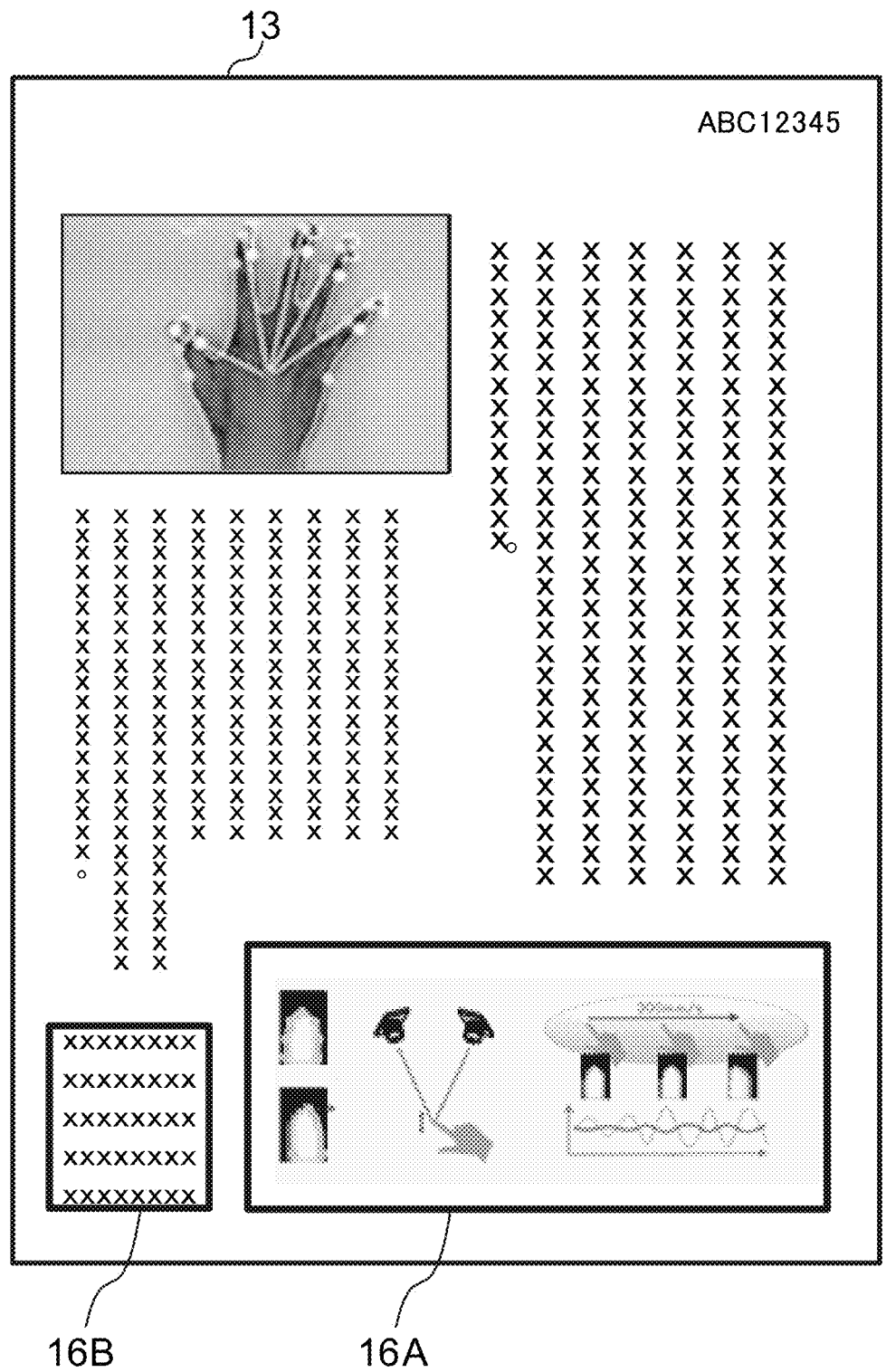
FIG. 10 is a diagram illustrating an example of frame lines specifying articles that have already been cut out and saved.

Next, at step S14, the projection controller 123 generates frame line images indicating already cut out article regions based on the "article position" information passed from the cutout processing section 122, and controls the projector unit 112 so as to project the frame lines onto the page surface 13. FIG. 10 illustrates an example of frame lines 16 projected onto the page surface 13. In the example of FIG. 10, it is indicated that an article enclosed by a frame line 16A and an article enclosed by a frame line 16B are articles that have already been cut out and saved.

In cases in which the article that the user himself wants to cut out is an article enclosed by a frame line 16, the user selects the article by, for example, touching a region inside the frame line 16 indicating that article. However, in cases in which the article the user himself wants to cut out is not enclosed by a frame line 16, the region 14 of the article the user wants to cut out is designated by the operation that was explained using FIG. 4.

Figure 11:
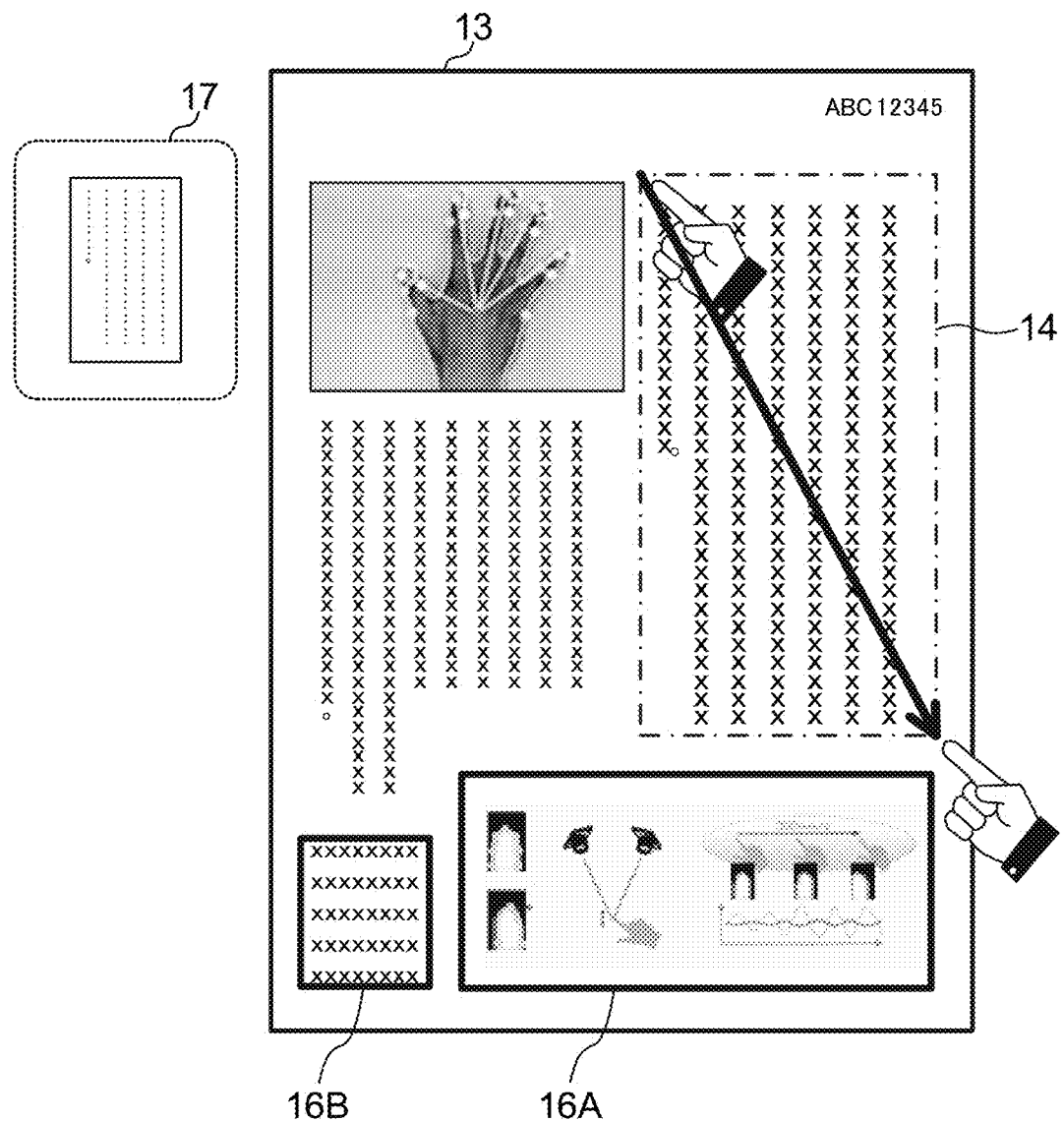
FIG. 11 is a diagram for explaining cutting out an article by region designation.

Next, at step S15, the cutout processing section 122 determines whether or not the region 14 has been designated by the user. This determination can be made by determining whether or not operation information has been passed from the operation recognition section 121 to the cutout processing section 122, the operation category included in the operation information being region designation. Processing transitions to step S16 in cases in which the operation category included in operation information passed from the operation recognition section 121 to the cutout processing section 122 is region designation, However, processing, transitions to step S21 in cases in which operation information has not been passed from the operation recognition section 121 to the cutout processing section 122, or in cases in which the operation category included in passed operation information is not region designation. Here, as illustrated in FIG. 11, we suppose that the region 14 indicating an article other than the articles enclosed by the frame line 16A, 16B has been designated.

At step S16, the cutout processing section 122 generates an article ID for the article inside the region 14 designated by the user. For example, given an xy coordinate system in which the top left of the page surface 13 is the origin, the rightward direction is the positive direction along the x axis, and the downward direction is the positive direction along the y axis, the cutout processing section 122 can set coordinates of a given position of the article in the designated region 14 as the article ID. In the case of a written article, the given position of the article may be set to the center position of text (for example, the headline of the article) specified using a predetermined row number, column number, and character number. In cases in which the specified text is shared and there are plural articles present in different ranges, an article ID that can uniquely identify the article is generated by, for example, appending an additional number to the coordinates. Moreover, in the case of an image article such as a photograph or an illustration, the given position of the article can be set to, for example, the top right of the image, the center of the image, or a position of a feature point indicating a predetermined feature. The article ID is not limited to being represented by a coordinate of a given position using the xy coordinate system; a given position that represents a position relative to a predetermined reference position on the page surface 13 (for example, the top right corner, the center, or a position of a feature point) may be employed.

Next, at step S17, the cutout processing section 122 acquires the article position of the article inside the region 14 designated by the user. For example, the cutout processing section 122 acquires, as the article position, an array containing coordinates of the four corners of the rectangular region 14 on the xy coordinate system described above. Position coordinates indicating the region 14 designated by the user, from out of information included in the operation information passed from the operation recognition section 121, may be employed as the article position. However, in such cases, some variance arises between the regions 14 designated by each user and an error may arise in the article position, even when a region 14 indicating the same article is designated. Thus, position information enabling unique specification from the article inside the region 14 designated by the user is preferably employed as the article position. For example, a rectangle circumscribing writing, illustrations, or the like inside the region 14 designated by the user can be set, and an array containing the coordinates of four corners of a region that respectively provides given margins at the top, bottom, left, and right of the circumscribing rectangle can be set as the article position. Moreover, in cases in which there is a line enclosing the article, an array containing the coordinates of four corners of a region that provides respective given margins at the top, bottom, left, and right of the enclosing line may serve as the article position.

Moreover, the cutout processing section 122 acquires image data inside the region 14, and text data obtained from that image data by OCR processing, as the article content.

Next, at step S18, the cutout processing section 122 generates a thumbnail image from the image data inside the region 14 acquired at step S17 above, and the thumbnail image is passed to the projection controller 123. As illustrated in FIG. 11, the projection controller 123 sets a given region of the work surface 10 (for example, the surrounding region of the page surface 13) as a thumbnail region 17 for projecting the thumbnail image of the article cut out by the current cutout work. The projection controller 123 then controls the projector unit 112 so as to project the thumbnail image passed from the cutout processing section 122 onto the thumbnail region 17.

Next, at step S19, the cutout processing section 122 acquires the user ID of the user who performed the cutout work. The user ID may be acquired from information inputted by the user when, for example, the document camera device 100 starts up, or may be acquired by instructing the user to input their user ID during the current step. The cutout processing section 122 then registers, in the article DB 126, the page surface ID acquired at step S12 above, the article ID generated at step S16 above, the user ID acquired at the current step, and the article position and article content acquired at step S17 above.

Figure 12:
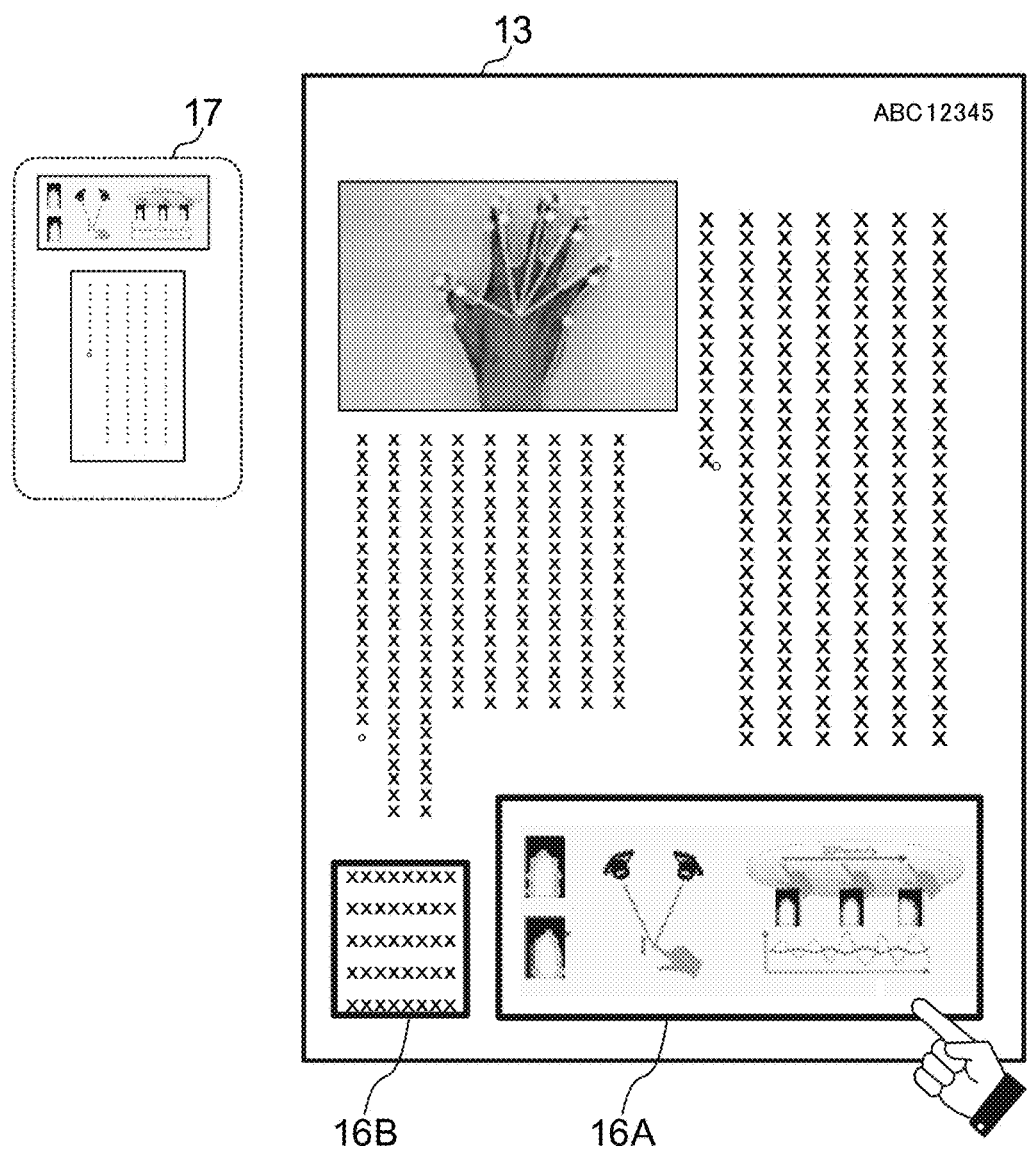
FIG. 12 is a diagram for explaining cutting out an article by selecting an article enclosed by a frame line.

In cases in which negative determination is made at step S15 above and processing transitions to step S21, at step S21, the cutout processing section 122 determines whether or not any of the articles enclosed in the frame lines 16 have been selected by the user. The determination can be made by determining whether or not operation information has been passed from the operation recognition section 121 to the cutout processing section 122, the operation category included in the operation information being article selection. Processing transitions to step S22 in cases in which the operation category included in operation information passed from the operation recognition section 121 to the cutout processing section 122 is article selection. However, processing transitions to step S24 in cases in which operation information has not been passed from the operation recognition section 121 to the cutout processing section 122, or in cases in which the operation category included in the passed operation information is not article selection. Here, as illustrated in FIG. 12, it is supposed that the article enclosed by the frame line 16A has been selected.

At step S22, the cutout processing section 122 specifies the article information in the article DB 126 corresponding to the selected article as article information to be reused. The cutout processing section 122 then generates a thumbnail image from the image data included in the "article content" of the article information to be reused, and passes the thumbnail image to the projection controller 123. As illustrated in FIG. 12, the projection controller 123 controls the projector unit 112 so as to project the thumbnail image passed from the cutout processing section 122 onto the thumbnail region 17.

Next, at step S23, the cutout processing section 122 acquires the user ID of the user performing the cutout work. The cutout processing section 122 then copies the article information to be reused and changes the "user ID" item to the acquired user ID before registering the article information as new article information in the article DB 126. Thus, the cutout processing for the article is performed without performing the processing of step S16 or step S17 above, which are performed in cases in which the article is cut out by designating a region.

Next, at step S24, the operation recognition section 121 determines whether or not a command for indicating the end of cutout mode has been input by the user. Processing returns to step S15 in cases in which a command indicating the end of cutout mode has not been input, or the cutout processing ends in cases in which a command indicating the end of cutout mode has been input.

Next, explanation follows regarding layout processing.

Figure 13:
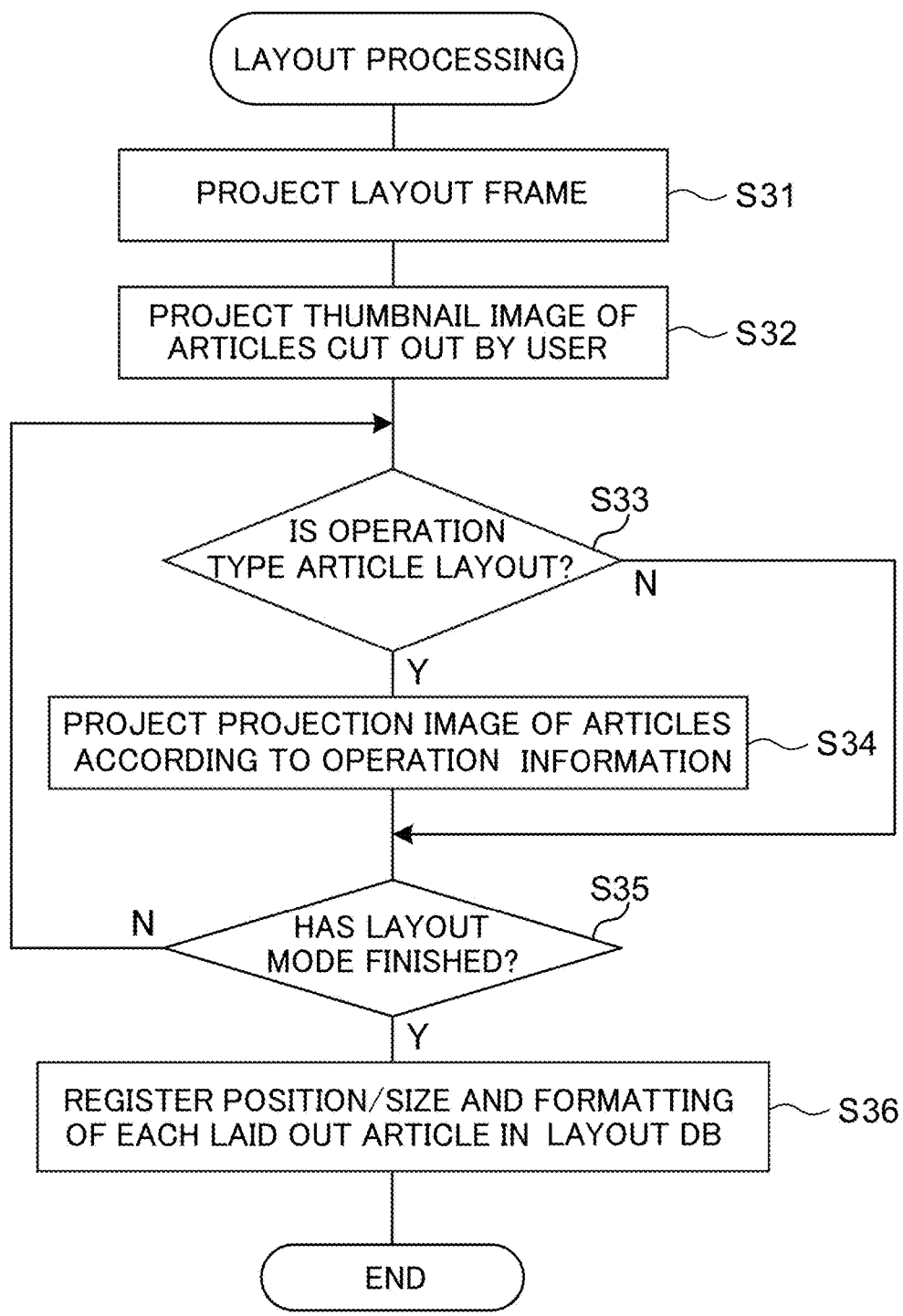
FIG. 13 is a flowchart illustrating an example of layout processing.
Figure 14:
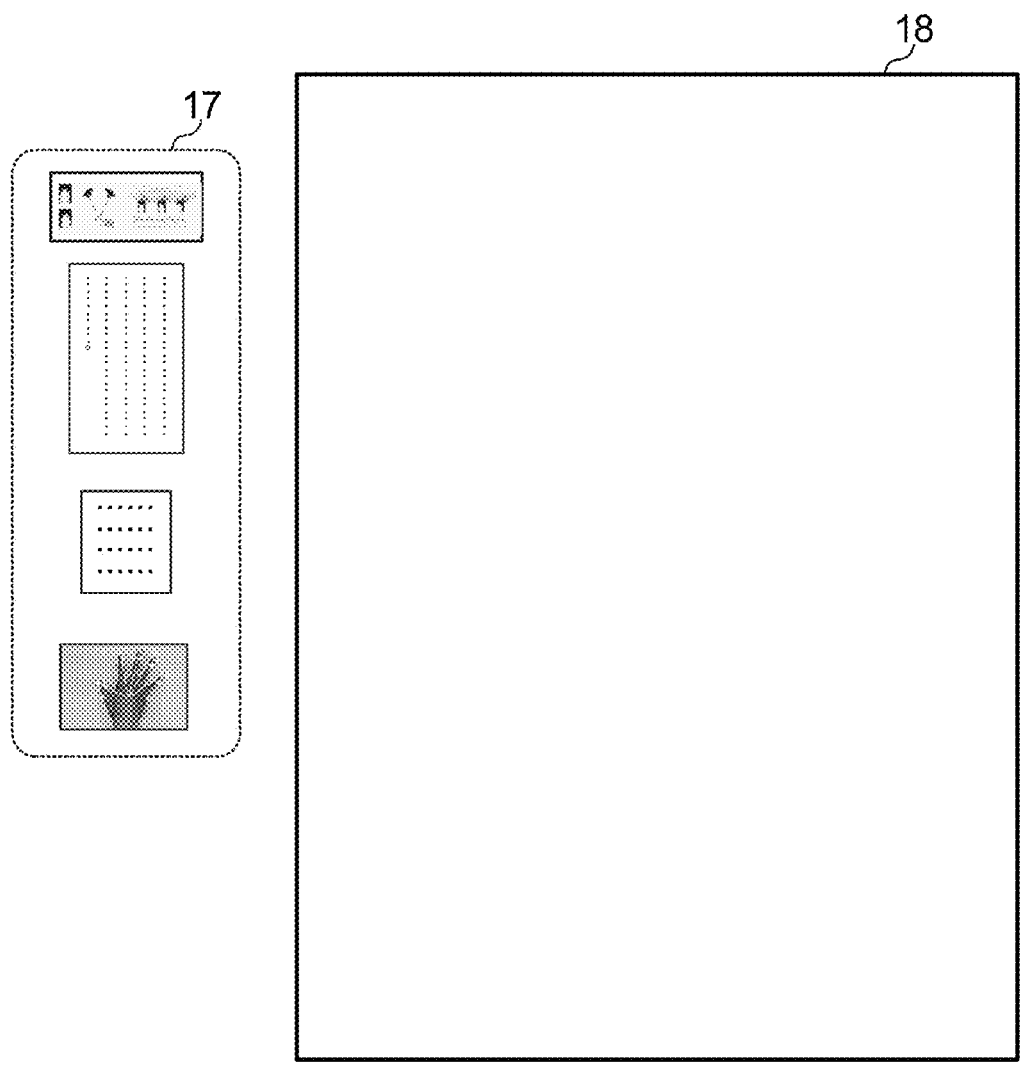
FIG. 14 is a diagram illustrating an example of a projection image at an initial stage of layout processing.

At step S31 of the layout processing illustrated in FIG. 13, the projection controller 123 controls the projector unit 112 so as to project a layout frame 18 onto the work surface 10 as illustrated in FIG. 14. The layout frame 18 is projected onto the work surface 10 at a given size, such as a size corresponding to the size of A4 printer paper.

Next, at step S32, the cutout processing section 122 acquires the user ID of the user generating the layout. The cutout processing section 122 then extracts article information having a "user ID" that is the same as the acquired user ID, from out of the article information saved in the article DB 126. The cutout processing section 122 then generates respective thumbnail images from the image data included in each "article content" of the extracted article information, and passes each of the thumbnail images to the projection controller 123. As illustrated in FIG. 14, the projection controller 123 controls the projector unit 112 such that each thumbnail image passed from the cutout processing section 122 is projected onto the thumbnail region 17.

Figure 15:
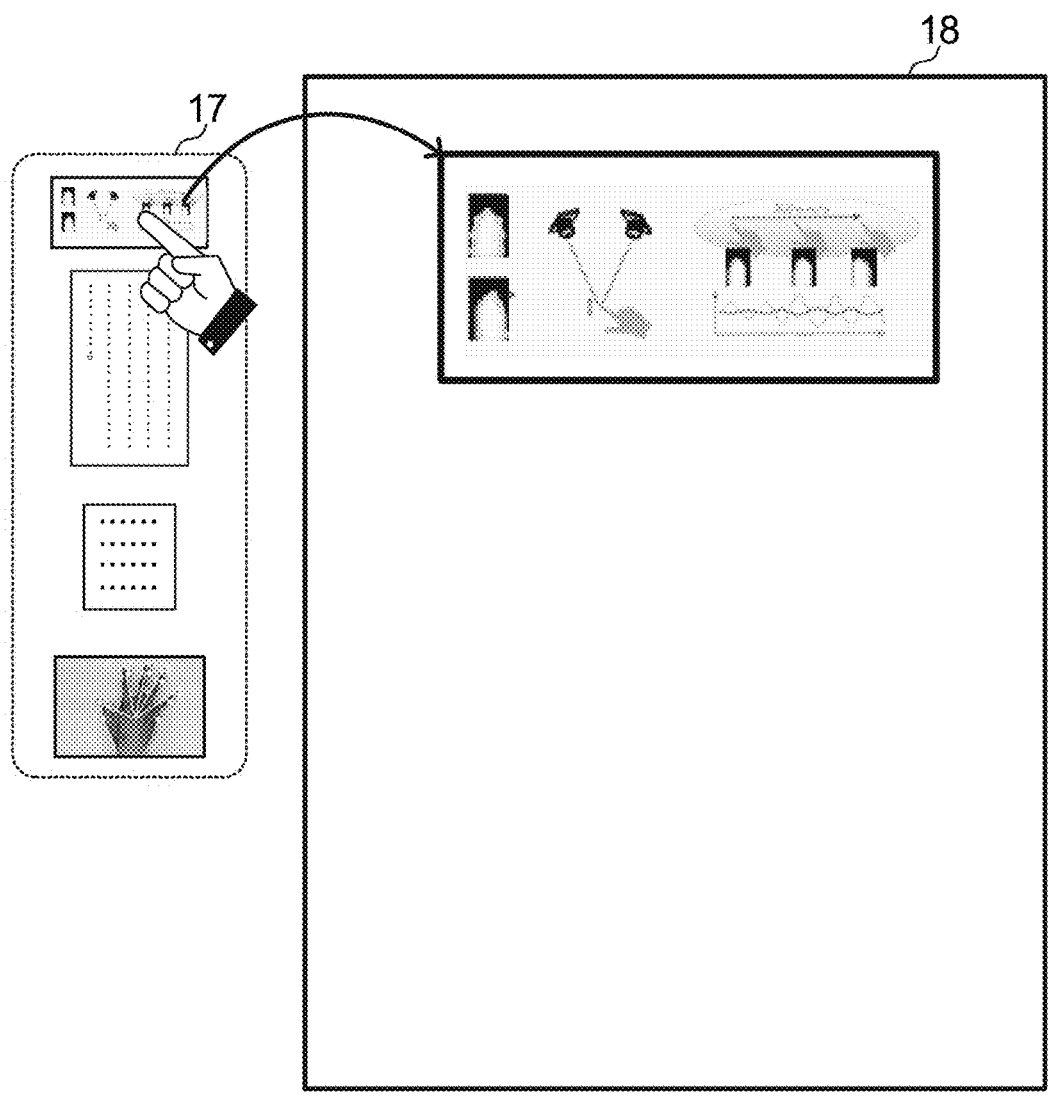
FIG. 15 is a diagram for explaining disposing art article inside a layout frame.

As illustrated in FIG. 15, the user, for example, disposes the desired article inside the layout frame 18 by moving the thumbnail image from the thumbnail region 17 to the layout frame 18 using a drag operation or the like. Moreover, for articles disposed in the layout frame 18, the user can designate the position of the article, the size of the article, the size and color of text within the article, whether the text is vertical or horizontal, and formatting such as the brightness and the contrast of the image within the article.

Next, at step S33, the cutout processing section 122 determines whether or not the article has been laid out by the user. This determination can be made by determining whether or not operation information has been passed from the operation recognition section 121 to the cutout processing section 122, the operation category included in the operation information being article layout. Processing transitions to step 834 in cases in which the operation category included in the operation information has been passed from the operation recognition section 121 to the cutout processing section 122 is article layout. However, processing transitions to step S35 in eases in which operation information has not been passed from the operation recognition section 121 to the cutout processing section 122, or in cases in which the operation category included in passed operation information is not article layout.

At step S34, the cutout processing section 122 generates article images respectively representing the articles such that the articles are laid out in the layout frame 18 based on the operation information passed from the operation recognition section 121, and passes the generated article images to the projection controller 123. More specifically, the cutout processing section 122 acquires, from the article DB 126, article information corresponding to the thumbnail images selected from the thumbnail region 17 by the user. Then, the image data and text data included in the "article content" of the article information is used to generate article images set with the formatting designated by the user. The projection controller 123 controls the projector unit 112 so as to project the article images inside the layout frame 18.

Next, at step S35, the operation recognition section 121 determines whether or not a command for indicating the end of layout mode has been input by the user. Processing returns to step S33 in cases in which a command indicating the end of layout mode has not been input, or processing transitions to step S36 in eases in which a command indicating the end of layout mode has been input.

At step S36, the cutout processing section 122 acquires the corresponding article information from the article DB 126 for each article image disposed in the layout frame 18. The cutout processing section 122 then combines the "page surface ID" and the "article ID" of each acquired item of article information, and sets article specifying information for specifying the articles represented by the article images that have been laid out. The cutout processing section 122 also acquires arrays containing coordinates of four corners of each of the article images as the positions and sizes of the article images. The cutout processing section 122 also acquires formatting set for each of the article images. The cutout processing section 122 also acquires the user ID of the user who generated the layout. The cutout processing section 122 then sets employed-article information that collects together the acquired article specifying information, the position and size, and the formatting for each of the articles disposed in the layout frame 18. For each article inside the layout frame 18, the cutout processing section 122 associates each item of employed-article information with the acquired user ID, appends the layout ID to the associated information, and registers this in the layout DB 127 as the layout information. The layout processing then ends.

As explained above, in the document camera device according to the first exemplary embodiment, when there are already articles that have been cut out and saved from the same page surface, frame lines indicating those articles are projected onto the page surface. When the article that the user himself wants to cut out is an article enclosed by a frame line, the user selects the article without designating a region. In cases in which an article enclosed by a frame line has been selected, an article indicated by article information saved in the article DB is reused as the article being cut out this time, without re-performing data processing related to cutting out. Operation load can thus be reduced for the user since a duplicate operation that designates the region is unnecessary for articles that have already been cut out and saved. Processing load is also reduced fir processing by the document camera device since execution of duplicate data processing related to cutting out, such as generation of an article ID and acquisition of image data of a designated region, is unnecessary. Thus, in the document camera device according to the first exemplary embodiment, operations for designating cutout regions by the user and data processing related to cuffing out are reduced, and cutout work can be made more efficient.

Second Exemplary Embodiment

Next, explanation follows regarding as second exemplary embodiment. Portions of a document camera device according to the second exemplary embodiment similar to those of the document camera device 100 according to the first exemplary embodiment are allocated the same reference numerals, and detailed explanation thereof is omitted.

As illustrated in FIG. 1, a document camera device 200 according to the second exemplary embodiment includes the head section 110 and a controller 220.

As illustrated in FIG. 3, the controller 220 includes the operation recognition section 121, a cutout processing section 222, and a projection controller 223 as functional sections.

Similarly to the cutout processing section 122 of the first exemplary embodiment, for a page surface 13 disposed on the work surface 10, the cutout processing section 222 specifies an article position of an article that has already been cut out and saved from that same page surface. In addition, the cutout processing section 222 of the second exemplary embodiment generates thumbnail images from image data included in the "article contents" of the article information indicating articles that were already cut out and saved. The cutout processing section 222 appends correspondence information associating article position information with the thumbnail image of the same article to the article position information and the thumbnail image, and passes the article position information and thumbnail image appended with the correspondence information to the projection controller 223.

Similarly to the projection controller 123 of the first exemplary embodiment, the projection controller 223 controls the projector unit 112 so as to project frame lines 16 indicating articles that have already been cut out and saved onto the page surface 13, based on the article position information passed from the cutout processing section 222. Moreover, as illustrated in FIG. 16, the projection controller 223 controls the projector unit 112 so as to project the correspondence information (circled numerals 1 and 2 in the example of FIG. 16) appended to the article position information onto the frame lines 16 or onto a given position, for example, at the surroundings of the frame lines 16.

Figure 16:
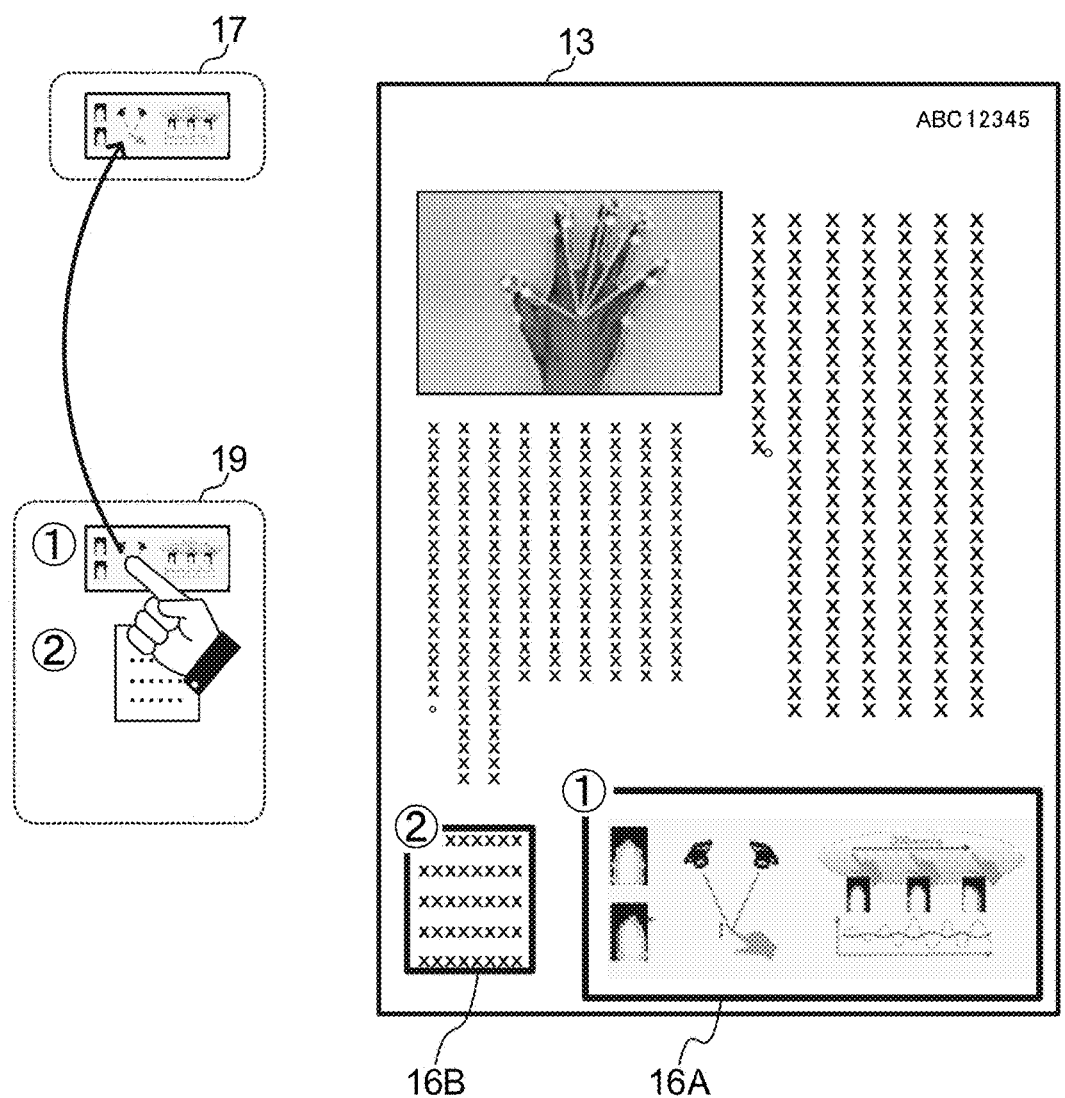
FIG. 16 is a diagram for explaining article selection using thumbnail images.

As illustrated in FIG. 16, the projection controller 223 sets a reference thumbnail region 19 in a given region of the work surface 10 for example, below the thumbnail region 17) for projecting the thumbnail images of the articles enclosed by the frame lines 16. The projection controller 223 then controls the projector unit 112 so as to project the thumbnail images and the correspondence information of the already cut out and saved articles that were passed from the cutout processing section 222 onto the reference thumbnail region 19.

Similarly to in the case of the first exemplary embodiment, the user can select an article that they want to cut out by touching inside of the frame lines 16, and can select the article they want to cut out by touching a thumbnail image projected onto the reference thumbnail region 19. As illustrated in FIG. 16, the user may select an article that they want to cut out by performing a drag operation or the like on a thumbnail image projected onto the reference thumbnail region 19, so as to move the thumbnail image from the reference thumbnail region 19 to the thumbnail region 17.

The document camera device 200 may be implemented by, for example, the computer 40 illustrated in FIG. 7. A cutout assistance program 250 for causing the computer 40 to function as the document camera device 200 is stored in the storage section 43 of the computer 40. The cutout assistance program 250 includes the operation recognition process 51, a cutout processing process 252, and a projection control process 253.

The CPU 41 reads the cutout assistance program 250 from the storage section 43, expands the cutout assistance program 250 into the memory 42, and sequentially executes the processes included in the cutout assistance program 250. The CPU 41 operates as the operation recognition section 121 illustrated in FIG. 3 by executing the operation recognition process 51. The CPU 41 also operates as the cutout processing section 222 illustrated in FIG. 3 by executing the cutout processing process 252. The CPU 41 also operates as the projection controller 223 illustrated in FIG. 3 by executing the projection control process 253. The computer 40, which executes the cutout assistance program 250, thereby functions as the document camera device 200.

Note that functionality implemented by the cutout assistance program 250 may be implemented by, for example, a semiconductor integrated circuit, or more specifically, by an ASIC.

Next, explanation follows regarding operation of the document camera device 200 according to the second exemplary embodiment. In the second exemplary embodiment, the operation of the cutout processing differs from that of the document camera device 100 according to the first exemplary embodiment, and explanation of the cutout processing of the second exemplary embodiment is therefore given with reference to FIG. 17. In the cutout processing of the second exemplary embodiment, processing similar to that of the cutout processing of the first exemplary embodiment is allocated the same reference numerals, and detailed explanation thereof is omitted.

Figure 17:
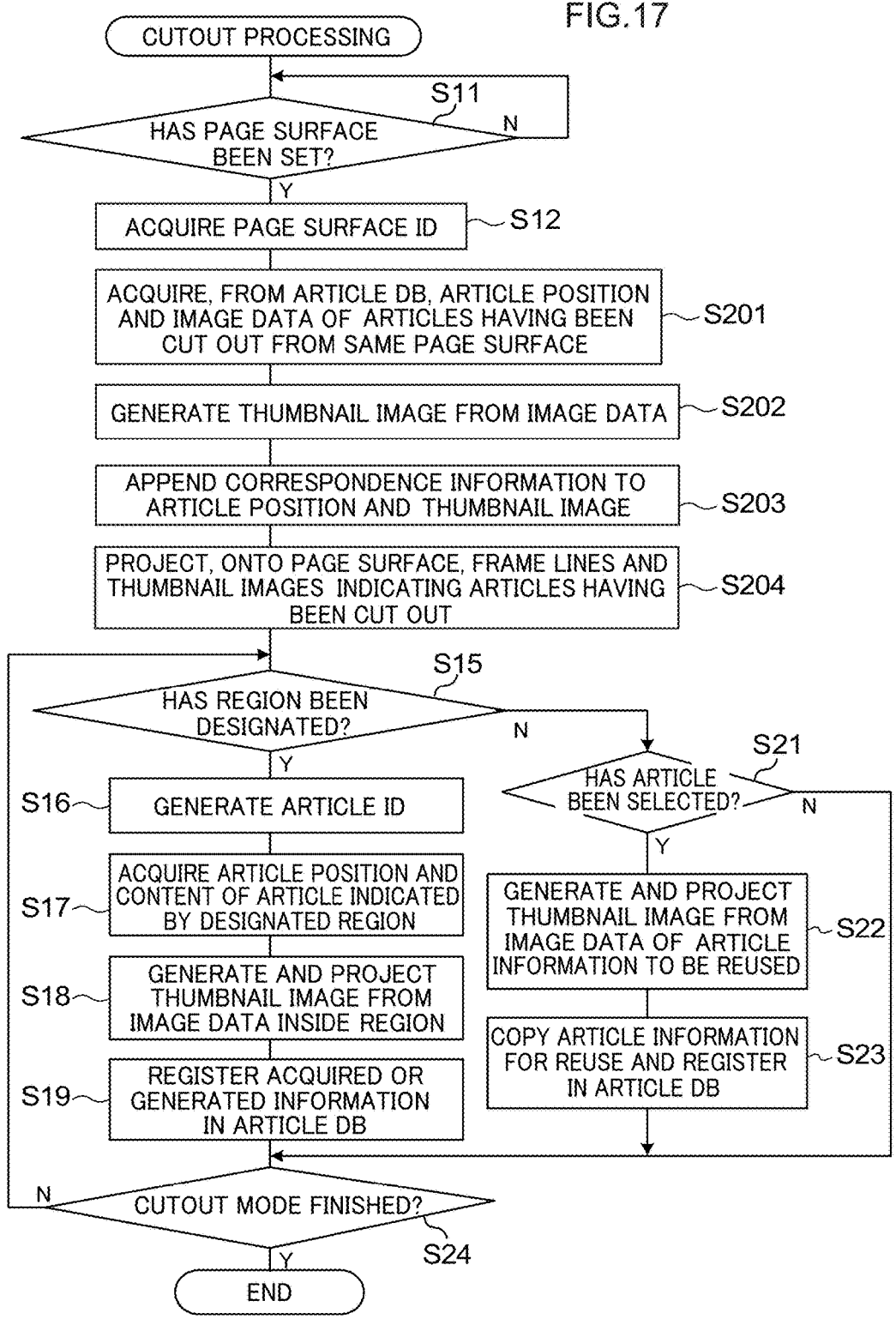
FIG. 17 is a flowchart illustrating an example of cutout processing of the second exemplary embodiment.

At step S201, which follows step S12 of the cutout processing illustrated in FIG. 17, the cutout processing section 222 references the article DB 126 and specifies article information in the article DB 126 for which the "page surface ID" is the same as the page surface ID acquired at step S12 above. The cutout processing section 222 then acquires the "article position" information of the specified article information, and image data included in the "article content".

Next, at step S202, the cutout processing section 222 generates a thumbnail image from the image data acquired at step S201 above.

Next, at step S203, the cutout processing section 222 respectively appends correspondence information associating the article position information with the thumbnail images for the articles to the article position information and the thumbnail images. The cutout processing section 222 then passes the article position information and the thumbnail images that are appended with the correspondence information to the projection controller 223.

Next, at step S204, the projection controller 223 controls the projector unit 112 so as to project, onto the page surface 13, the frame lines 16 indicating the regions of the articles that have already been cut out, based on the information passed from the cutout processing section 222. The projection controller 223 controls the projector unit 112 so as to project the thumbnail images of the articles enclosed by the frame lines 16 onto the reference thumbnail region 19. The projection controller 223 controls the projector unit 112 so as to project the correspondence information appended with the article position information and the thumbnail images onto a given position.

As explained above, in the document camera device according to the second exemplary embodiment, articles that have already been cut out and saved are not only displayed to the user by the frame lines, but the thumbnail images of the articles are also displayed. The user can select an ankle that has already been cut out and saved not only by selecting the article enclosed in the frame lines, but also by selecting the thumbnail image. In cases in which a region of an article that has already been cut out and saved is duplicated and the duplicated portion is selected by being touched or the like by the user, it is indeterminable which article has been selected by the user. Even in such cases, according to the document camera device of the second exemplary embodiment, thumbnail images indicating each article that has already been cut out and saved are also displayed, and the article can be selected by selecting a thumbnail image, thereby enabling the selected article to be appropriately determined.

Third Exemplary Embodiment

Next, explanation follows regarding a third exemplary embodiment. Portions of a document camera device according to the third exemplary embodiment similar to those of the document camera device 100 according to the first exemplary embodiment are allocated the same reference numerals and detailed explanation thereof is omitted.

As illustrated in FIG. 1, a document camera device 300 according to the third exemplary embodiment includes the head section 110 and a controller 320.

As illustrated in FIG. 3, the controller 320 includes the operation recognition section 121, a cutout processing section 322, and a projection controller 323 as functional sections.

Similarly to the cutout processing section 122 of the lint exemplary embodiment, for the page surface 13 disposed on the work surface 10, the cutout processing section 322 specifies article positions for articles that have already been cut out and saved from that same page surface. In addition, in cases in which any article enclosed by frame lines 16 has been selected by the user, the cutout processing section 322 of the third exemplary embodiment specifies other articles cut out by a user who cut out the selected article in the past. More specifically, the cutout processing section 322 finds the article intonation indicating the selected article from the article DB 126, and specifies article information that has the same "page surface ID" and "user ID" as the found article information. The cutout processing section 322 passes the "article position" information of the specified article information to the projection controller 323.

The projection controller 323 controls the projector unit 112 so as to highlight articles enclosed by frame lines 16 indicated by the "article positions" passed from the cutout processing section 322. Suppose for example, articles that have already been cut out and saved are displayed to the user by the respective frame line 16A and frame line 16B, as illustrated in FIG. 12. Suppose that the article enclosed by the frame line 16A and the article enclosed by the frame line 16B are both articles that have been cut out by a user B in the past. Suppose that, in such a state, a user A currently performing cutout work has selected the article in the frame line 16A. In this ease, the article in the frame line 16B, which is another article that has been cut out by the user B who cut out the article in the frame line 16A, is highlighted, as illustrated in FIG. 18.

Figure 18:
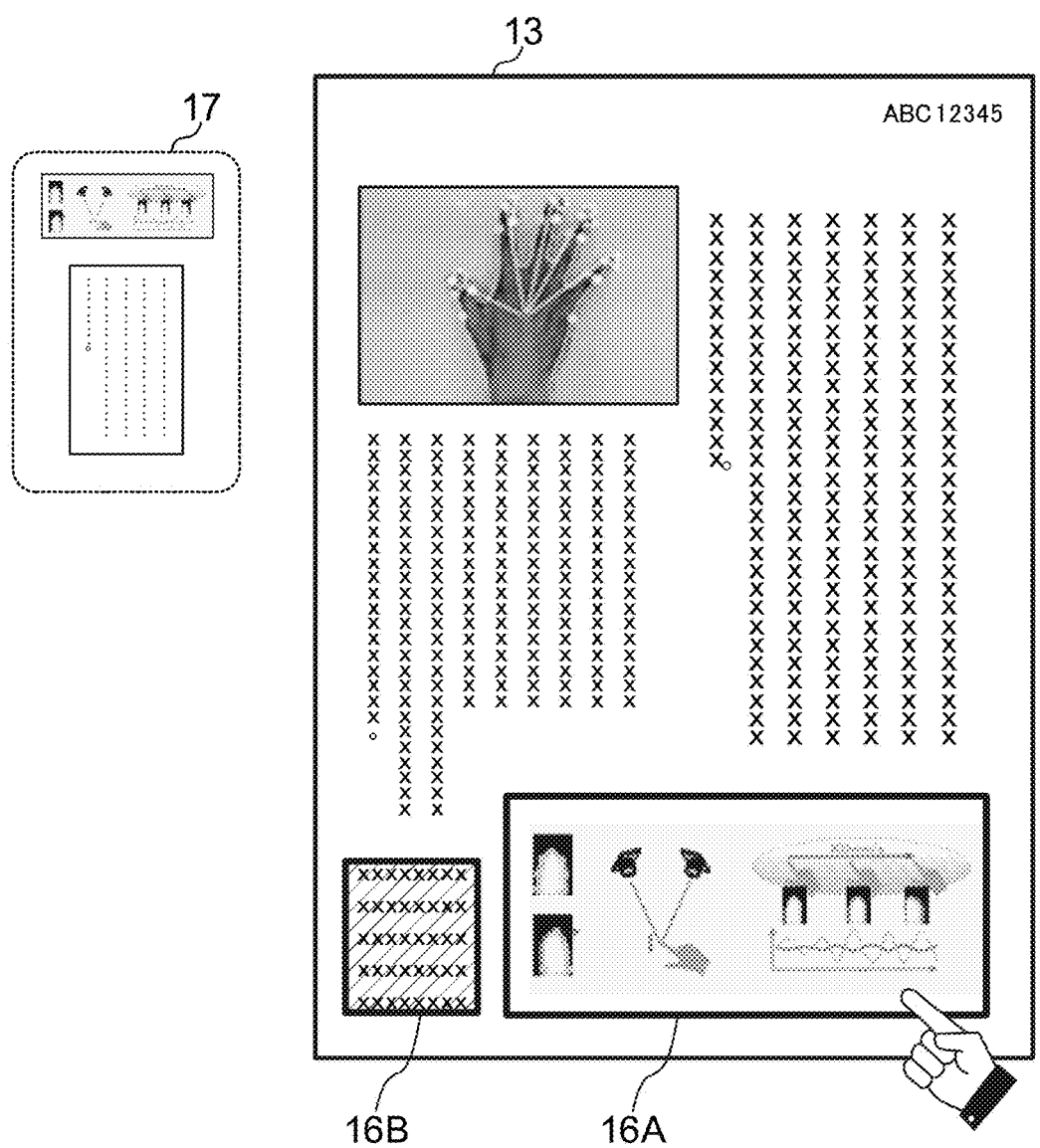
FIG. 18 is a diagram for explaining highlighted display of articles cut out by the same user.

In FIG. 18, article highlighting is represented by hatching the target article; however, the method of highlighting is not limited to this example. For example, the frame lines 16 enclosing the article being highlighted may be made bolder than ordinary frame lines 16, the frame lines 16 may be made dotted, or a message stating that another article has been cut out by the user who cut out the selected article may be displayed.

The document camera device 300 may be implemented, for example, by the computer 40 illustrated in FIG. 7. A cutout assistance program 350 for causing the computer 40 to function as the document camera device 300 is stored in the storage section 43 of the computer 40. The cutout assistance program 350 includes the operation recognition process 51, a cutout processing process 352, and a projection control process 353.

The CPU 41 reads the cutout assistance program 350 from the storage section 43, expands the cutout assistance program 350 into the memory 42, and sequentially executes the processes included in the cutout assistance program 350. The CPU 41 operates as the operation recognition section 121 illustrated in FIG. 3 by executing the operation recognition process 51. The CPU 41 also operates as the cutout processing section 322 illustrated in FIG. 3 by executing the cutout processing process 352. The CPU 41 also operates as the projection controller 323 illustrated in FIG. 3 by executing the projection control process 353. The computer 40, which executes the cutout assistance program 350, thereby functions as the document camera device 300.

Note that functionality implemented by the cutout assistance program 350 may be implemented by, for example, a semiconductor integrated circuit, or more specifically, by an ASIC.

Next, explanation follows regarding operation of the document camera device 300 according to the third exemplary embodiment. In the third exemplary embodiment, the operation of the cutout processing differs from that of the document camera device 100 according to the first exemplary embodiment, and the cutout processing of the third exemplary embodiment is therefore explained with reference to FIG. 19. In the cutout processing of the third exemplary embodiment, processing similar to that of the cutout processing of the first exemplary embodiment is allocated the same reference numerals, and detailed explanation thereof is omitted.

Figure 19:
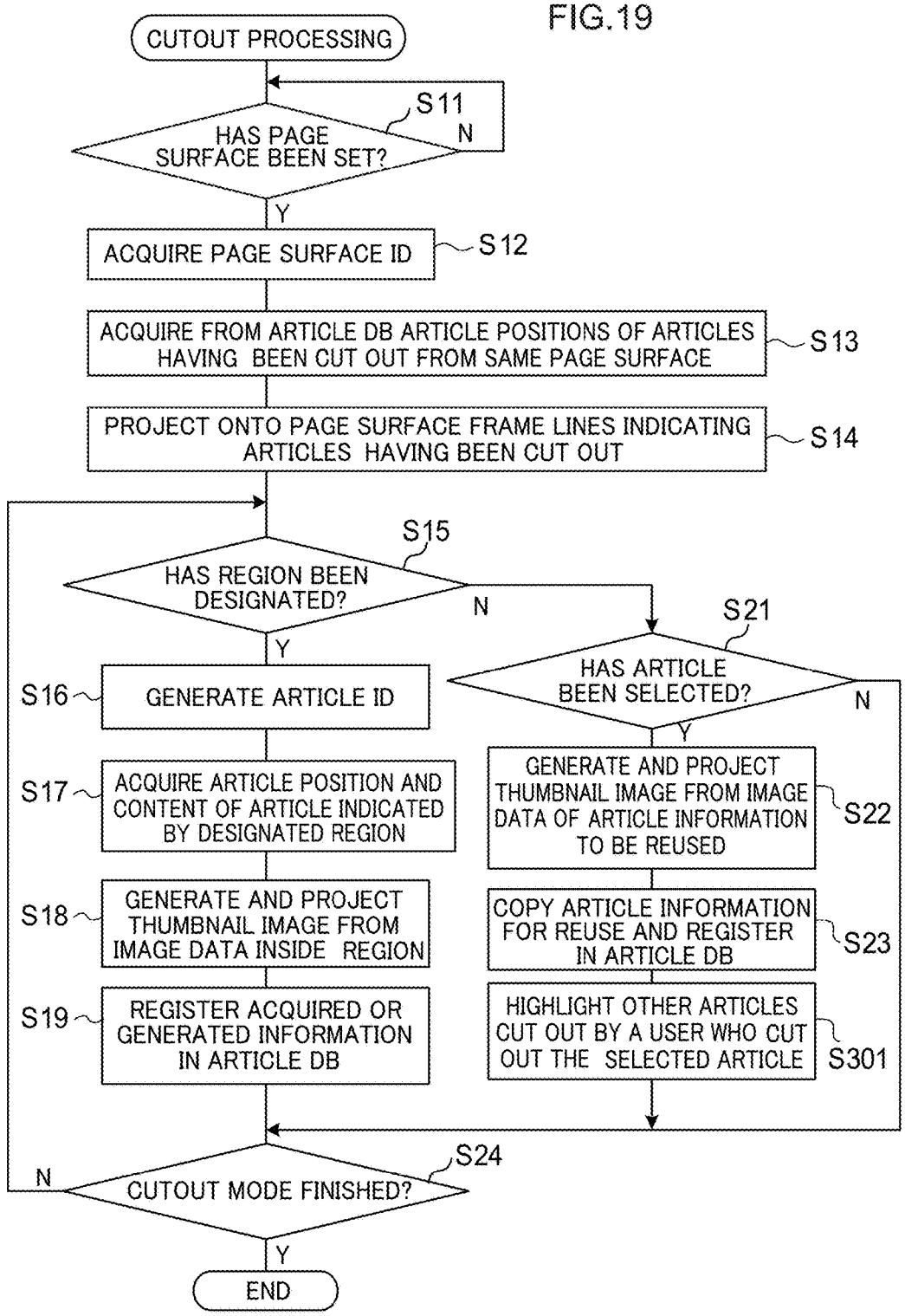
FIG. 19 is a flowchart illustrating an example of cutout processing of the third exemplary embodiment.

At step S301, which follows step S23 of the cutout processing illustrated in FIG. 19, the cutout processing section 322 finds the article information indicating the article determined to have been selected at step S21 above from the article DB 126. The cutout processing section 322 then specifies article information having the same "page surface ID" and "user ID" as the found article information, and passes the "article position" information of the specified article information to the projection controller 323. The projection controller 323 controls the projector unit 112 such that the article enclosed by the frame lines 16 indicating the "article position" passed from the cutout processing section 322 is displayed highlighted.

As explained above, in the document camera device according to the third exemplary embodiment, when articles that have already been cut out and saved are displayed to the user, other articles cut out by the user who has cut out the article selected by the user currently performing the cutout work are displayed highlighted. This enables tendencies of other users when cutting out articles to be displayed to the user currently performing cutout work, and can assist in making cutout work more efficient.

Explanation has been given in each of the exemplary embodiments above regarding cases in which image data is included when copying in cases in which article information saved in the article DB is information that includes image data of the article indicated by that article information, and past article information is reused. However, there is no limitation thereto. Another database in which page surface IDs and article IDs are registered associated with image data of cut out articles may be provided, and history information associating page surface IDs, article IDs, and user IDs may be registered in the article DB. In such cases, duplicate registration of image data in the same article DB can be avoided even when article information has been reused and copied, thus enabling the employed memory region to be reduced.

Moreover, in each of the exemplary embodiments above, explanation has been given regarding configurations in which a single head section and a single controller are provided. However, there is no limitation thereto. For example, a configuration in which plural head sections and one controller are provided may be adopted, and the controller may respectively control the plural head sections. Moreover, configuration may be made such that plural controllers are respectively provided to lone functional sections, which correspond to the plural respective head sections, and the article DB and the layout DB alone are stored in the shared storage device capable of accessing each of the controllers.

In each of the exemplary embodiments above, as illustrated in FIG. 14, explanation has been given regarding a case in which, the layout frame 18 and the thumbnail image of articles cut out by the user generating the layout are projected in the initial stage of the layout processing. However, there is no limitation thereto.

Figure 20:
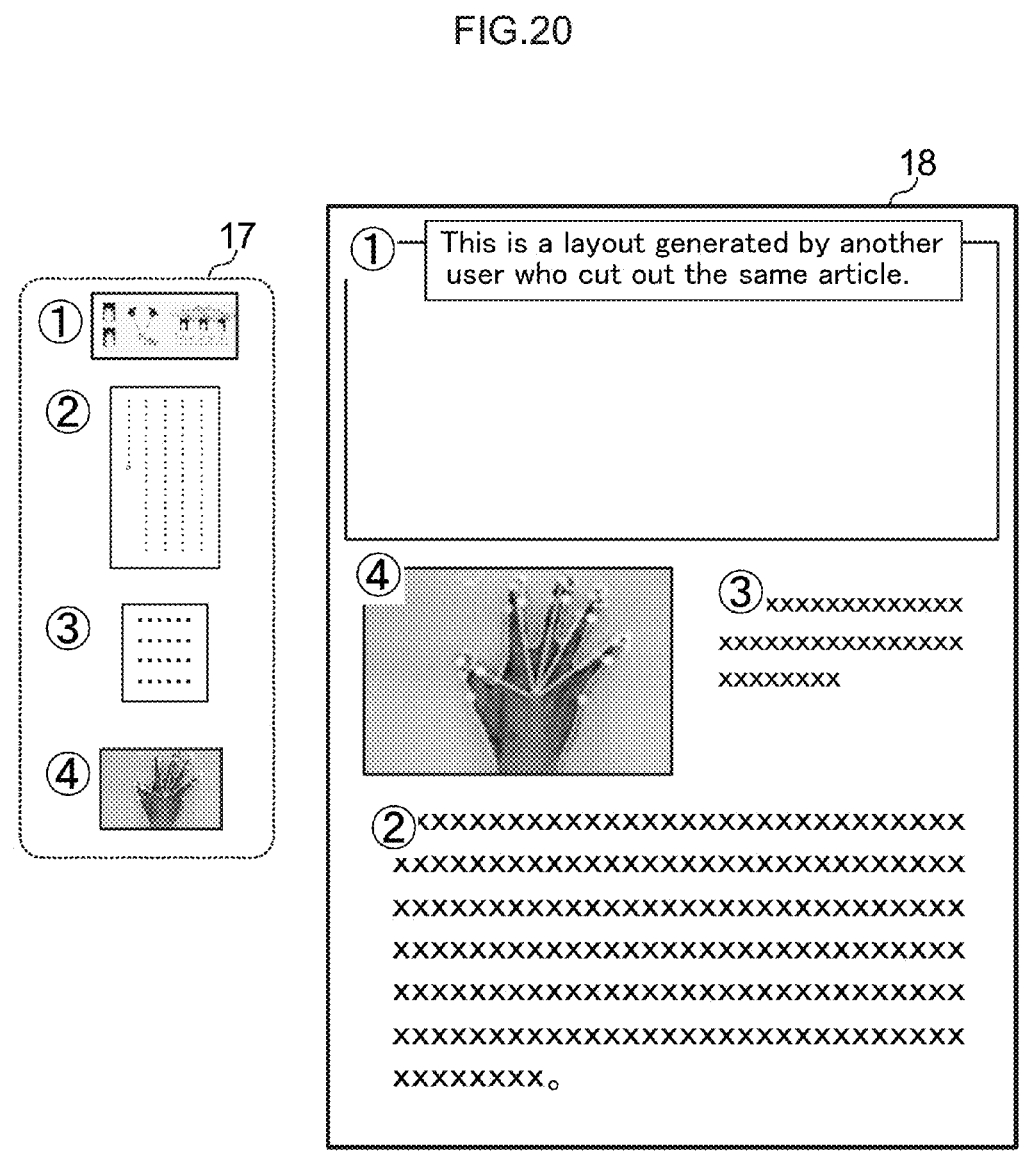

For example, in cases in which them is another layout generated by another user who cut out the same article as the article being cut out by the user generating the layout, the other layout may be projected in the initial stage so that the other layout can be reused, as illustrated in FIG. 20. Since the article that has been laid out sometimes has a size, formatting, or the like modified from the state in which the article was cut out from the page surface, correspondence information indicating a correspondence between the thumbnail image and the article inside the layout frame 18 (the circled numerals 1, 2, 3, and 4 in the example of FIG. 20) may be projected in combination therewith.

Layouts may be reused even when the article that the user. A currently generating the layout wants to cut out, and the article that the user B who generated the layout to be reused wants cut out are not perfectly identical, for example, when the same articles have been cut out a given number of times or more. In such cases, thumbnail images are preferably projected such that articles cut out by both the user A and the user B, articles cut out by the user A only, and articles cut out by the user B only, can be identified.

Although explanation has been given in each of the exemplary embodiments above regarding modes in which the cutout assistance program is pre-stored (installed) in the storage section 43, there is no limitation thereto. The program according to technology disclosed herein may be provided in a mode recorded on a recording medium such as a CD-ROM, a DVD-ROM, or USB memory.

In work to cut out an article using a document camera, a user performing the work to cut out the article from, for example, a newspaper, needs to read the newspaper article and perform an operation to designate a region that they want to cut out for each needed article. For example, supposing that representatives of respective posts of an enterprise each perform cutout work, it is conceivable that the representatives will each perform work to cut out the same article from the same newspaper. In such a case, the operation to designate the region of the article that the user wants to cut out, and data processing related to cutting out, such as acquisition of article data of the designated region, are duplicated, and this is inefficient.

The conventional technology does not give consideration to cutout work being duplicated by plural users as described above, and therefore does not make cutout work more efficient.

One aspect according to technology disclosed herein enables a user to perform an operation for designating a cutout region and reduces data processing related to the cutout, and also can assist in making cutout work more efficient.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A document camera device comprising:
   a memory; and
   a processor coupled to the memory, the processor being configured to:
   perform control so as to display, in cutout processing that cuts out and saves, from an image imaging a subject, an image corresponding to an inside of a region designated for the subject, an image specifying a region associated with identification information of a subject targeted by current cutout processing on the subject targeted by the current cutout processing, based on history information associated with identification information of the subject and with the region in cutout processing that was executed in the past; and
   perform processing that, when a region specified by an image specifying the region has been selected, sets an image cut out and saved from inside the selected region as an image that has been cut out by the current cutout processing.

2. The document camera device of claim 1, wherein control is performed so as to display a thumbnail image of an image cut out and saved from the region specified by the image specifying the region together with display of the image specifying the region.

3. The document camera device of claim 2, wherein when the thumbnail image has been selected, processing is performed to set an image corresponding to the selected thumbnail image as the image cut out by the current cutout processing.

4. The document camera device of claim 2, wherein control is performed so as to display association information that associates the image specifying the region with the thumbnail image of the image cut out and saved from the region specified by the image.

5. The document camera device of claim 1, wherein control is performed so as to emphasize on the subject another region associated with identification information of a user associated with the selected region, based on history information that has been further associated with identification information of a user who has performed cut out processing.

6. The document camera device of claim 1, further comprising:
   an imaging unit that images a given range including the subject; and
   a projector unit that projects an image onto the given range including the subject,
   the processor further being configured to control projection of images by the projector unit.

7. The document camera device of claim 6, wherein, when a user touch operation on the region specified by the image specifying the region is recognized from an image imaged by the imaging unit, the region is determined to have been selected.

8. A cutout assistance method comprising:
   by a processor, performing control so as to display, in cutout processing that cuts out and saves, from an image imaging a subject, an image corresponding to an inside of a region designated for the subject, an image specifying a region associated with identification information of a subject targeted by current cutout processing on the subject targeted by the current cutout processing, based on history information associated with identification information of the subject and with the region in cutout processing that was executed in the past; and
   by the processor, performing processing that, when a region specified by an image specifying the region has been selected, sets an image cut out and saved from inside the selected region as an image that has been cut out by the current cutout processing.

9. The cutout assistance method of claim 8, wherein control is performed so as to display a thumbnail image of an image cut out and saved from the region specified by the image specifying the region together with display of the image specifying the region.

10. The cutout assistance method of claim 9, wherein, when the thumbnail image has been selected, processing is performed to set an image corresponding to the selected thumbnail image as the image cut out by the current cutout processing.

11. The cutout assistance method of claim 9, wherein control is performed so as to display association information that associates the image specifying the region with the thumbnail image of the image cut out and saved from the region specified by the image.

12. The cutout assistance method of claim 8, wherein control is performed so as to emphasize on the subject another region associated with identification information of a user associated with the selected region, based on history information that has been further associated with identification information of a user who has performed cut out processing.

13. A non-transitory recording medium storing a cutout assistance program that causes a computer to execute a process, the process comprising:
   performing control so as to display, in cutout processing that cuts out and saves, from an image imaging a subject, an image corresponding to an inside of a region designated for the subject, an image specifying a region associated with identification information of a subject targeted by current cutout processing on the subject targeted by the current cutout processing, based on history information associated with identification information of the subject and with the region in cutout processing that was executed in the past; and
   performing processing that, when a region specified by an image specifying the region has been selected, sets an image cut out and saved from inside the selected region as an image that has been cut out by the current cutout processing.

14. The non-transitory recording medium of claim 13, wherein, in the process, control is performed so as to display a thumbnail image of an image cut out and saved from the region specified by the image specifying the region together with display of the image specifying the region.

15. The non-transitory recording medium of claim 14, wherein, in the process, when the thumbnail image has been selected, processing is performed to set an image corresponding to the selected thumbnail image as the image cut out by the current cutout processing.

16. The non-transitory recording medium of claim 14, wherein, in the process, control is performed so as to display association information that associates the image specifying the region with the thumbnail image of the image cut out and saved from the region specified by the image.

17. The non-transitory recording medium of claim 13, wherein, in the process, control is performed so as to emphasize on the subject another region associated with identification information of a user associated with the selected region, based on history information that has been further associated with identification information of a user who has performed cut out processing.

* * * * *